US012635003B2

(12) United States Patent
Ferdi et al.

(10) Patent No.: US 12,635,003 B2

(45) Date of Patent: May 19, 2026

(54) METHODS AND APPARATUS FOR C2 COMMUNICATIONS SECURITY ESTABLISHMENT, MODIFICATION AND REVOCATION

(71) Applicant: InterDigital Patent Holdings, Inc., Wilmington, DE (US)

(72) Inventors: Samir Ferdi, Kirkland (CA); Alec Brusilovsky, Downingtown, PA (US); Michelle Perras, Montreal (CA); Guanzhou Wang, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 467 days.

(21) Appl. No.: 17/925,973

(22) PCT Filed: May 20, 2021

(86) PCT No.: PCT/US2021/033439

§ 371 (c)(1),
(2) Date: Nov. 17, 2022

(87) PCT Pub. No.: WO2021/236947

PCT Pub. Date: Nov. 25, 2021

(65) Prior Publication Data

US 2023/0199863 A1      Jun. 22, 2023

Related U.S. Application Data

(60) Provisional application No. 63/109,962, filed on Nov. 5, 2020, provisional application No. 63/028,118, filed on May 21, 2020.

(51) Int. Cl.
*H04W 76/10*      (2018.01)
*G08G 5/56*      (2025.01)
(Continued)

(52) U.S. Cl.
CPC .............. *H04W 76/10* (2018.02); *G08G 5/56* (2025.01); *H04W 12/06* (2013.01); *H04W 84/06* (2013.01)

(58) Field of Classification Search
CPC ..... H04W 76/10; H04W 12/06; H04W 84/06; H04W 4/40; H04W 12/69; H04W 4/50;
(Continued)

(56) References Cited

U.S. PATENT DOCUMENTS

| | | | |
|---|---|---|---|
| 10,674,469 B2 | 6/2020 | Kim et al. | |
| 2019/0113912 A1 | 4/2019 | Olson | |
| 2019/0387428 A1 | 12/2019 | Ahmad et al. | |

FOREIGN PATENT DOCUMENTS

| | | |
|---|---|---|
| CN | 109416537 A | 3/2019 |
| CN | 110663284 A | 1/2020 |

(Continued)

OTHER PUBLICATIONS

3rd Generation Partnership Project (3GPP), "Remote Identification of Unmanned Aerial Systems", 3GPP TR 22.825 V16.0.0, Sep. 2018, Valbonne, France, 22 pages.

(Continued)

*Primary Examiner* — Cheikh T Ndiaye
(74) *Attorney, Agent, or Firm* — Flaster Greenberg PC

(57) ABSTRACT

Methods, apparatus, systems, architectures and interfaces for performing secure command and control (C2) communications in an Unmanned Aerial System (CAS) including a UAV controller (UAV-C) are provided. The method includes on condition that the UAV has completed a registration procedure with a network, transmitting, to a session management function (SMF) of the network, a packet data unit (PDU) session establishment request message; performing a secondary authentication, with any of the USS and the UTM, via the SMF; receiving a PDU session establishment
(Continued)

accept message including C2 security information; and establishing C2 communications security with the peer UAV-C using the C2 security information.

16 Claims, 15 Drawing Sheets

(51) Int. Cl.
*H04W 12/06* (2021.01)
*H04W 84/06* (2009.01)

(58) Field of Classification Search
CPC .. G08G 5/56; G08G 5/57; G08G 5/22; G08G 5/26; G08G 5/55
See application file for complete search history.

(56) References Cited

FOREIGN PATENT DOCUMENTS

WO WO-2020033905 A1 * 2/2020 ......... H04L 63/0892
WO 2022149104 A1 7/2022

OTHER PUBLICATIONS

3rd Generation Partnership Project (3GPP), "Generic Authentication Architecture (GAA); Access to network application functions using Hypertext Transfer Protocol over Transport Layer Security (Https)", ETSI, TS 133 222, V15.0.0, Jul. 2018, 35 pages.
3rd Generation Partnership Project (3GPP), "Architecture enhancements for 5G System (5GS) to support Vehicle-to-Everything (V2X) services", 3GPP TS 23.287, V16.2.0, Mar. 2020, 53 pages.
3rd Generation Partnership Project (3GPP), "Authentication and key management for applications; based on 3GPP credential in 5G (AKMA)", 3GPP TS 33.535, V0.5.0, May 2020, 17 pages.
3rd Generation Partnership Project (3GPP), "Technical Specification Group Services and System Aspects; Enhancement for Unmanned Aerial Vehicles", 3GPP TR 22.829, V0.0.0, Nov. 2018, 14 pages.
3rd Generation Partnership Project (3GPP), "Generic Authentication Architecture (GAA); Generic Bootstrapping Architecture (GBA)", 3GPP TS 33.220, V16.0.0, Sep. 2019, 93 pages.
3rd Generation Partnership Project (3GPP), "Generic Authentication Architecture (GAA); Support for subscriber certificates", ETSI TS 133 221, V15.0.0, Jul. 2018, 26 pages.
3rd Generation Partnership Project (3GPP), "Generic Authentication Architecture (GAA); Generic Bootstrapping Architecture (GBA) Push function", ETSI TS 133 223, V15.0.0, Nov. 2018, 26 pages.
3rd Generation Partnership Project (3GPP), "Generic Authentication Architecture (GAA); Generic Bootstrapping Architecture (GBA) push layer", ETSI TS 133 224, V15.0.0, Nov. 2018, 22 pages.
3rd Generation Partnership Project (3GPP), "Procedures for the 5G System", 3GPP TS 23.502 V16.1.1, Jun. 2019, 495 pages.
3rd Generation Partnership Project (3GPP), "Proximity-based Services (ProSe); Security aspects", ETSI TS 133 303 V15.0.0, Jul. 2018, 90 pages.
3rd Generation Partnership Project (3GPP), "Security aspects of 3GPP support for advanced Vehicle-to-Everything (V2X) services", 3GPP TS 33.536 V1.1.0, Apr. 2020, 22 pages.
3rd Generation Partnership Project (3GPP), "Study on supporting Unmanned Aerial Systems (UAS) connectivity, Identification and tracking", 3GPP TR 23.754 V1.1.0, Oct. 2020, 133 pages.
3rd Generation Partnership Project (3GPP), "System Architecture for the 5G System", 3GPP TS 23.501 V16.1.0, Jun. 2019, 368 pages.
3rd Generation Partnership Project (3GPP), "Proximity-based services (ProSe)", ETSI TS 123 303 V15.1.0, Jul. 2018, 130 pages.
3rd Generation Partnership Project (3GPP), "Unmanned Aerial System (UAS) support in 3GPP", 3GPP TS 22.125 V17.1.0, Dec. 2019, 16 pages.
Intel, "Definition and introduction of C2 Communication", S1-192791 3GPP TSG-SA WG1 Meeting #87 Sophia-Antipolis,, Aug. 19-23, 2019, 4 pages.

* cited by examiner

METHODS AND APPARATUS FOR C2 COMMUNICATIONS SECURITY ESTABLISHMENT, MODIFICATION AND REVOCATION

CROSS-REFERENCE TO RELATED APPLICATIONS

This application is the 371 National Stage of International Application No. PCT/US2021/033439, filed May 20, 2021, which claims priority to U.S. Provisional Application No. 63/109,962, filed Nov. 5, 2020, and U.S. Provisional Application No. 63/028,118, filed May 21, 2020, the disclosures of which are incorporated herein by reference in their entireties.

BACKGROUND

The present invention relates to the field of communications and, more particularly, to methods, apparatus, systems, architectures and interfaces for communications in an advanced or next generation wireless communication system, including communications carried out using any of a new radio or a new radio (NR) access technology and communication systems. Such communication systems may include Unmanned Aerial Systems (UASs) for communications performed by unmanned aerial vehicles (UAVs) and UAV controllers (UAV-Cs) and/or UAS traffic management (UTM).

BRIEF DESCRIPTION OF THE DRAWINGS

Furthermore, like reference numerals in the figures indicate like elements, and wherein.

DETAILED DESCRIPTION

Example Networks for Implementation of the Embodiments

Figure 1A:
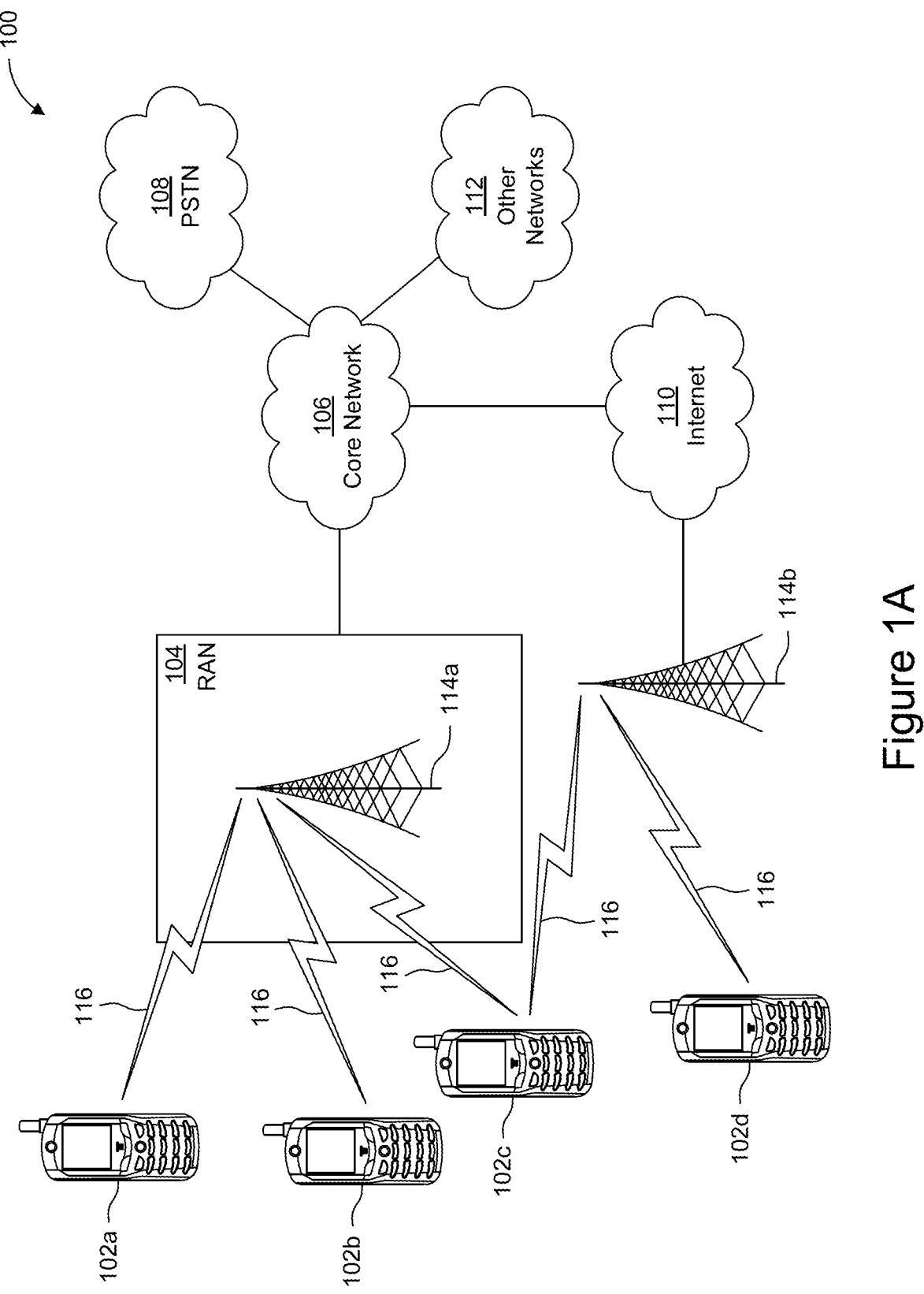
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
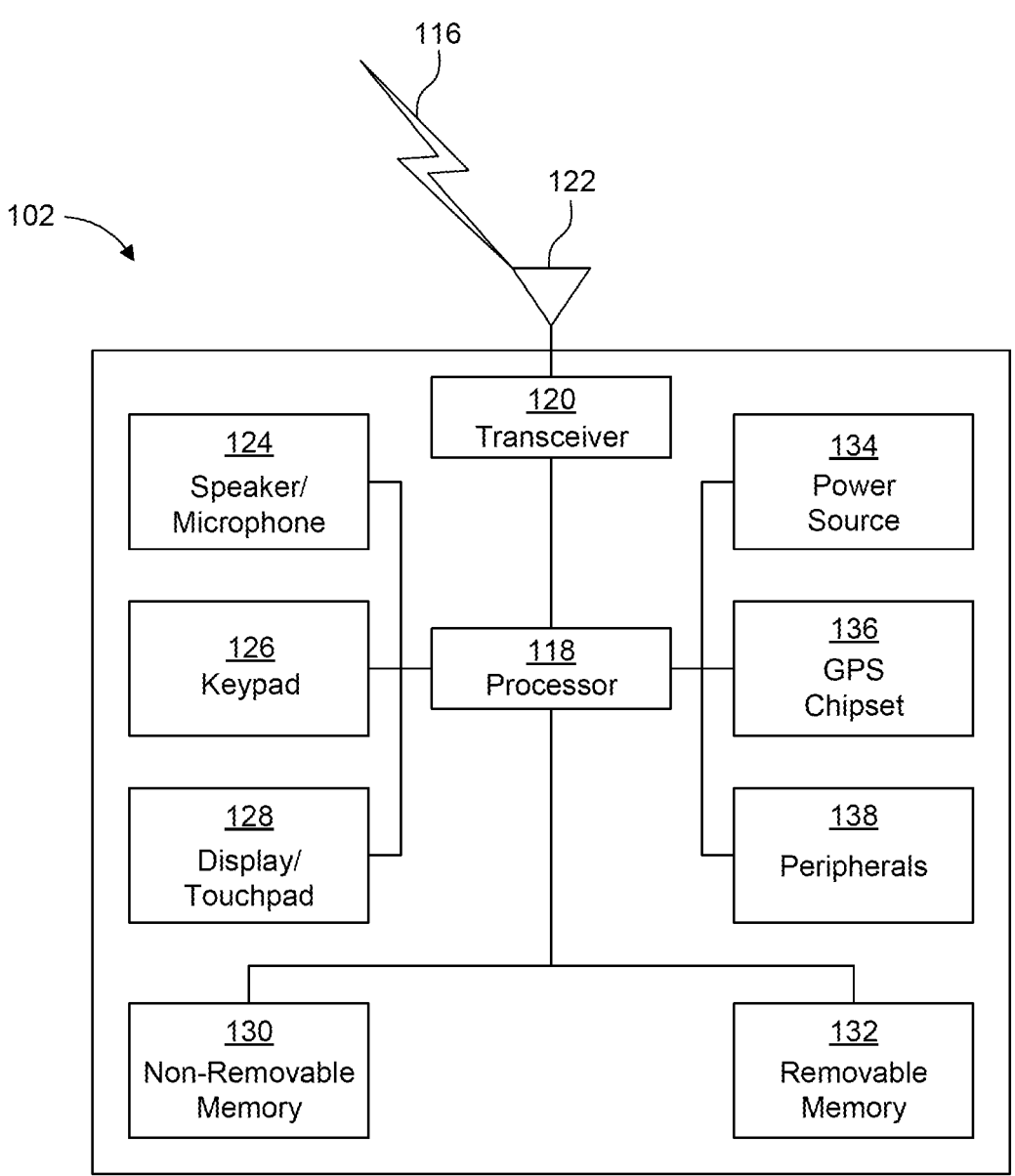
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
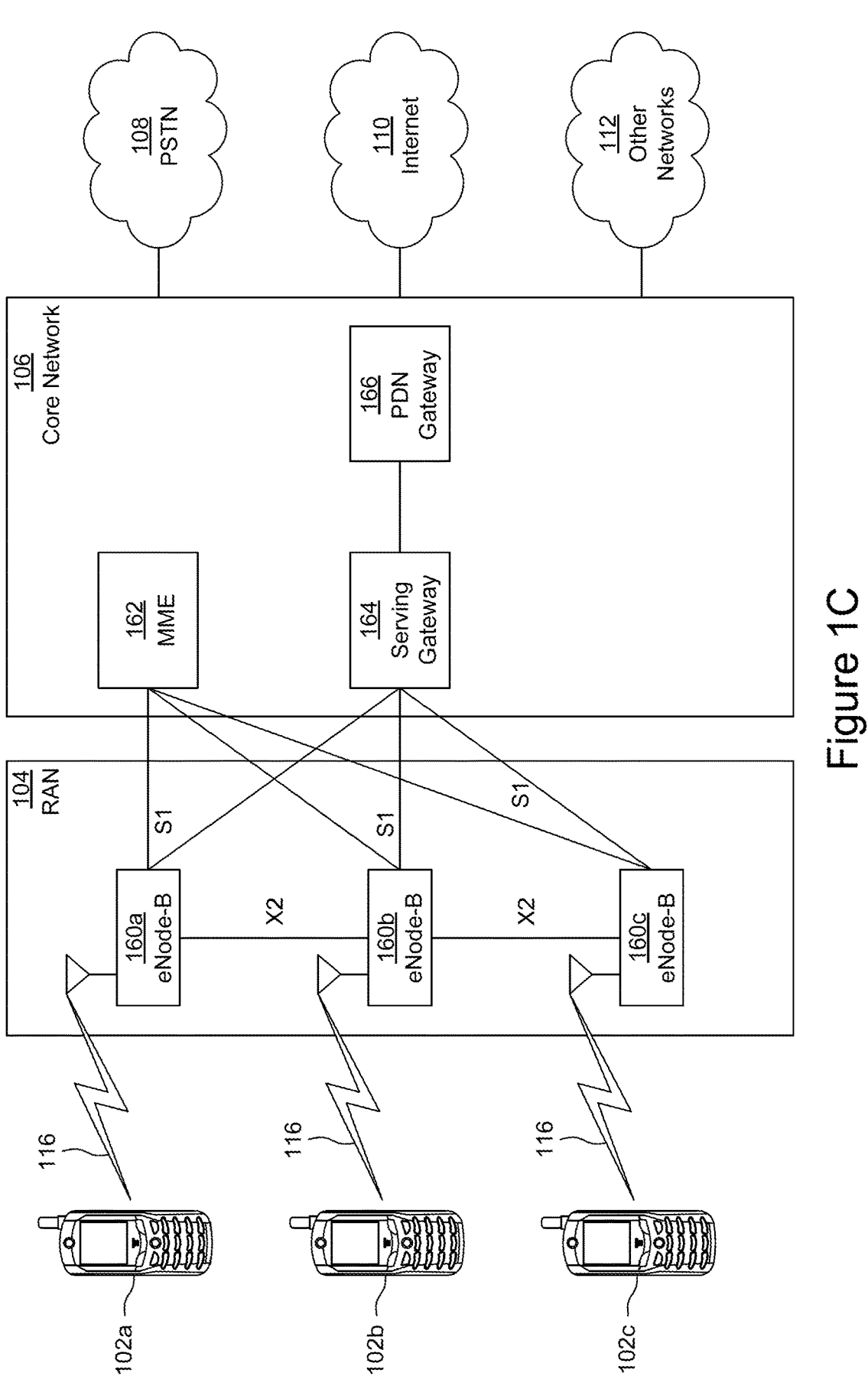
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
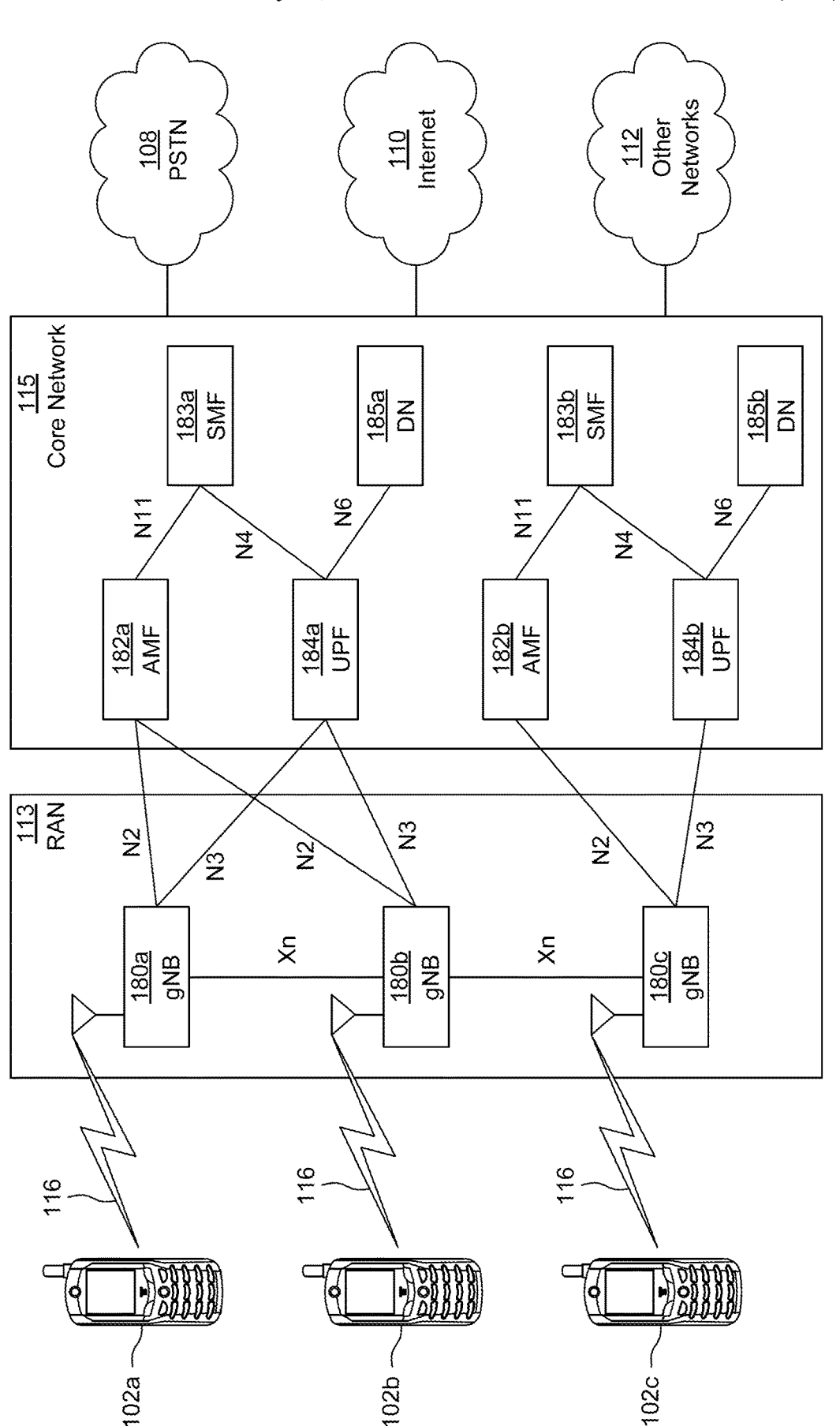
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Unmanned Aerial System (UAS)

For Release 16 (Rel16), the 3$^{rd}$ Generation Partnership Project (3GPP) has identified use cases and (e.g., potential) requirements for UAS support. For example, requirements for UAS remote identification and authorization have been specified. Further, for Release 17 (Rel-17), 3GPP has identified additional enhancements for UAS support such as: (1) UAS Command and Control (C2) communications, (2) Unmanned Aerial Vehicle (UAV) navigation by any of a UAV Controller (UAV-C) or a UAS Traffic Management (UTM), and (3) change of UAV-C during a flight mission. As referred to hereinbelow, a WTRU may be interchangeably referred to as a UAV.

Figure 2:
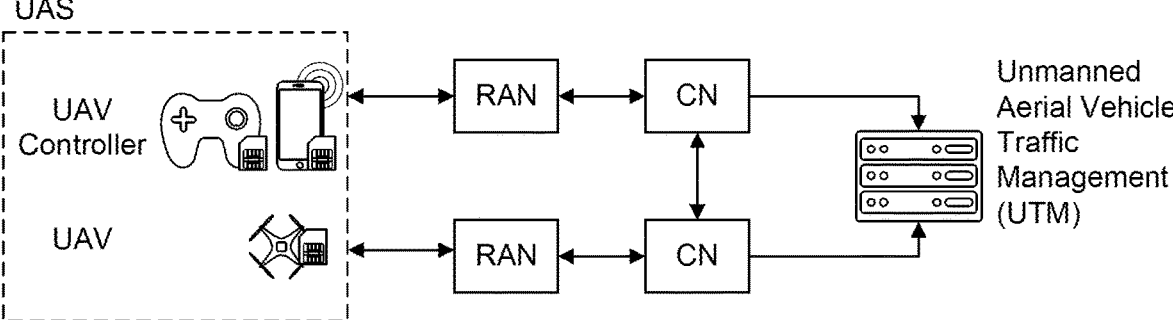
FIG. 2 is a diagram illustrating UAS interaction with a network and UTM for authorization, according to embodiments.

FIG. 2 is a diagram illustrating UAS interaction with a network and UTM for authorization, according to embodiments.

3GPP defines a UAS as the combination of a UAV (e.g., a drone) and a UAV-C, for example, as illustrated in FIG. 2. The 3GPP system provides communications capabilities between the UAV and a UAV controller, which may communicate through the same or different RAN nodes, for example, including via different PLMNs. However, the UAV-C may (e.g., also) be connected over a non-3GPP access. In the case of a UAS, the UTM provides any of UAS identification and tracking, authorization, enforcement, and regulation of UAS operations. Further, in the case of a UAS, the UTM stores the data required for a UAS operation.

3GPP has identified three types of command and control (C2) communications: (1) direct, (2) network-assisted, an (3) UTM-navigated. In the case of direct C2 communications, a UAV-C and a UAV use a direct C2 communication Link (e.g., D2D, PC5) to communicate with each other. In the case of network-assisted C2 communication, a UAV-C and a UAV use unicast C2 communication links (e.g., Uu, WLAN) with the network to communicate with each other. This method enables controlling a UAV beyond line of sight (BLOS), unlike the case of direct C2 communications. In the case of UTM-navigated C2 communication, a UAV with autonomous flying capabilities may fly according to a pre-scheduled flight plan, for example, under the supervision of a UTM. In such a case, the C2 communication link between a UAV and a UTM is used for any of the following: flight monitoring, dynamic route updates, and occasional navigation.

Bootstrapping

In a case of the 3GPP authentication infrastructure, application functions in/on any of the network and a WTRU side may (e.g., be enabled to) establish shared keys. In such a case, 3GPP may provide bootstrapping of application security to authenticate the subscriber, for example, by defining a Generic Bootstrapping Architecture (GBA) based on Authentication and Key Agreement (AKA) protocol. A GBA is specified for 3GPP Rel-6 through Rel-15. 3GPP is (e.g., presently) studying GBA adaptation for 5G. Security features and mechanisms are specified for supporting authentication and key management aspects for applications, for example, based on subscription credential(s) in a 5G system (e.g., AKMA). AKMA builds on GBA and its architecture is based on a service based architecture (SBA).

However, there is no separate authentication of a WTRU to support AKMA functionality. Instead, authentication of a WTRU reuses 5GS primary authentication procedure, which is executed during WTRU registration. AKMA, for example, as compared to GBA, specifies a simplified key hierarchy and provides certain advantages that are targeting and are limited to 5GS. While (e.g., stock, generic, etc.) GBA is anticipated to work in EPS and 5GS, and a 5G-specific type of GBA is being currently standardized, AKMA may be considered as a 5G-only technology. Accordingly, an application that relies on bootstrapping and is required to work with both EPS and 5GS may (e.g., has to) support either: (1) GBA and AKMA, or (2) GBA only.

Proximity Services (ProSe) Direct Discovery

Two discovery models have been defined in ProSe: (1) model A, and (2) model B. In the case of model A (e.g., "I am here"), two roles are defined for ProSe-enabled WTRUs that are participating in ProSe direct discovery: (1) an announcing WTRU, and (2) a monitoring WTRU. In the case of model A, an announcing WTRU announces (e.g., certain) information that may be used by WTRUs in proximity that have permission to discover (e.g., announcing) WTRUs. Further, in the case of model A, a monitoring WTRU monitors (e.g., certain) information of interest while in proximity of announcing WTRUs. In the case of model A, the announcing WTRU broadcasts discovery messages at pre-defined discovery intervals and the monitoring WTRUs that are interested in these messages read and process these messages.

In the case of model B (e.g., "who is there?"/"are you there?"), two roles for the ProSe-enabled WTRUs that are participating in ProSe Direct Discovery are defined: (1) a discoverer WTRU, and (2) a discoveree WTRU. A discoverer WTRU transmits a request containing certain information about what the discoverer WTRU is interested to discover (e.g., in discovering). Further, a discoveree WTRU receives the request message and may respond with (e.g., some) information related to the discoverer's request.

UAV Remote ID and Location Tracking

There may be mechanisms (e.g., as defined by 3GPP SA2) enabling any of a USS and/or a UTM to query for any of the location of a particular UAV or (e.g., in other cases) a location of any number of unknown (e.g., unidentified, unregistered, etc.) UAVs in an area (e.g., a particular target location area). In a case of querying for the location of a target (e.g., the particular) UAV, the USS/UTM sends a request to an exposure function (EF) of a network (e.g., a core network (CN) of a 3GPP system) providing the identity of the target UAV and gets (e.g., receives a message indicating) the location of the target UAV in response. In a case of querying for unknown UAVs in a target (e.g., particular) location/area, the USS/UTM provides target location area information without providing any UAV identity and gets in the response (e.g., receives a message indicating) all UAVs in that target/particular location/area. Further, a remote ID is a (e.g., regulatory/standards mandated) feature wherein a UAV transmits its identification information and (e.g., location) coordinates over a broadcast channel or to a Remote ID server to allow authorized entities (e.g., law enforcement) to identify and locate a given UAV (e.g., to obtain registration information about the owner/pilot). A remote ID is assigned by a USS/UTM. A Remote ID may be referred to (e.g., hereinabove) as any of a Civil Aviation Authority (CAA) level UAV ID or a UAS ID.

Command and Control (C2)

A UAV may be controlled using Command and Control (C2) messages from any of a UAV-C or a UTM. In the case of C2 traffic (e.g., C2 messages transmitted to/from any of a UAV, a UAV-C, and a UTM), end to end security (e.g., protection) for C2 traffic provides (e.g., is critical to ensure) safety/protection of UAV flight operations and privacy for the operator/pilot of the UAV. The protection of C2 traffic (e.g., only) over the UAV radio link may be insufficient, for example, since a peer UAV-C may be connected via a different PLMN or a different access technology (e.g., than that of the UAV), and may use a different security policy for user plane traffic (e.g., with no integrity and/or no confidentiality protection). In general, security of a UAV-C connection may be outside of the control of the mobile network operator (MNO) providing a service to the UAV. Thus, there is a need (e.g., a requirement) for end-to end-security.

According to embodiments, in the case of C2 traffic, there is a need to determine (1) how a UAV and a UAV-C may establish, modify, and revoke a security association (SA) used for C2 communications?; and (2) how is a 3GPP system and a USS/UTM involved in the establishment, modification, and revocation of a security association used for C2 communications? According to embodiments, in the case for direct C2 communications (e.g., using a PC5 interface, which may be referred to herein as C2 D2D) the following (e.g., issues) are to be addressed: (1) how may a UAV and a UAV-C be authorized for C2 D2D, and how may they discover and connect to each other for C2 D2D? (2) how may a UAV and a UAV-C authenticate each other and establish security when connecting to each other for C2 D2D?; and (3) any (e.g., new) identifier used to enable any of a remote ID (e.g., identification, identifier, etc.) and/or C2 D2D during discovery and communications may (e.g., should, must, etc.) be protected for privacy and may preserve existing (e.g., ProSe/V2X) identifiers privacy protection.

In view of the above, according to embodiments, it may be necessary (e.g., for solutions) to consider various deployments options such as: UAV and UAV-C under the same or different PLMNs; and a UAV-C not equipped with a WTRU. Additionally, according to embodiments, it may be necessary (e.g., for solutions) to allow control of the SA setup and SA (e.g., key) revocation process by MNO and/or UTM. According to embodiments, it may be necessary (e.g., for solutions) to allow for support of use case scenarios, such as change of UAV-C or UTM during flight operations/C2 communications. According to embodiments, (e.g., it may be necessary for) solutions, operations, features, methods, procedures, etc., discussed hereinbelow may be applicable to both EPS and 5GS.

A UAV may be tracked, for example, by authorized entities (e.g., any of a serving USS/UTM, a law enforcement agent, a third party, etc.), using any of a remote ID and network location tracking functionalities. According to embodiments, for example in a case of a UAV being tracked, privacy of a UAV may (e.g., should, must, needs to, etc.) be protected during any of remote ID and location tracking operations. That is, according to embodiments, a network system (e.g., a 3GPP system) may (e.g., should, must, needs to, etc.) ensure that (e.g., only) authorized entities may request for any of a UAV location and/or a set of UAVs location(s). For example, there may be a case where a USS/UTM may try to obtain location information about UAV served by a different (not authorized) USS/UTM. That is, an unauthorized (e.g., malicious) entity may try to obtain private location information about a UAV (e.g., to obtain intelligence about delivery UAV routes by a competitor). According to embodiments, (e.g., in view of such a case of unauthorized entities), UAV location information may be provided by a network (e.g., 3GPP) system (e.g., in a protected manner only, with the proper authorization verification) to authorized entities (e.g., USS/UTM), for example, to address such UAV privacy requirements (e.g., in view of above discussion).

Secure C2 Communications

According to embodiments (e.g., as discussed hereinbelow), a UAV may be assumed to have (e.g., to be equipped with) a 3GPP WTRU having UAS communications capabilities (e.g., unless explicitly mentioned otherwise). According to embodiments (e.g., as discussed hereinbelow), a UAV may be interchangeably referred to as any of a UAV and a WTRU. According to embodiments, UAV-C communication may be enabled via any of a (e.g., a UAV's) 3GPP WTRU component or any other (e.g., similar, suitable, etc.) type of communication module (e.g., wired communications module). According to embodiments (e.g., as discussed hereinbelow), a UAV-C equipped with its own 3GPP WTRU may be interchangeably referred to as any of a UAV-C and a WTRU.

According to embodiments, any of UAV identifier/identity (ID) or a UAV-C ID may respectively identify a UAV or a UAV-C device (e.g., a drone). According to embodiments, the UAV and/or UAV-C ID may be any of: (1) an external identifier provided by a USS/UTM, (2) assigned when the UAV/UAV-C is registered with a local authority (e.g., Federal Aviation Authority (FAA)), and/or (3) provided by a manufacturer of the UAV/UAV-C (e.g., a manufacturer serial number, a PEI, an IMEI, etc.), provisioned and/or known by the UAV/UAV-C device. According to embodiments, a UAV/UAV-C WTRU ID may identify a cellular subscription of a UAV/UAV-C (e.g., IMSI, MSISDN). According to embodiments, a UAS ID may identify a UAS (e.g., an association for/between a UAV and a UAV-C.

According to embodiments, a UAS ID may be allocated by a USS/UTM. According to embodiments a UAS ID may correspond to a temporary UAV identity (e.g., a session ID).

Network-Assisted C2 Communications

According to embodiments (e.g., as discussed hereinbelow), signaling communications between a WTRU (e.g., UAV and/or UAV-C) and a USS/UTM may be assumed to be using/for/associated with any of a user plane (UP) or a control plane (CP). For example, signaling between a WTRU and a USS/UTM may include UAS control messages carried as UAS containers using NAS transport. According to embodiments, (e.g., unless specified otherwise) a UAV and a UAV-C may be served by different PLMNs, and/or the UAV-C may be connected to a UAV via a connection (e.g., a landline, etc.) that is not through (e.g., via) a 3GPP network. According to embodiments, as referred to herein, a network entity (e.g., a PLMN) may consist of, for example, an E-UTRAN connected to a 5GC or an EPC, and/or an NG-RAN/NR connected to a 5GC.

Figure 3:
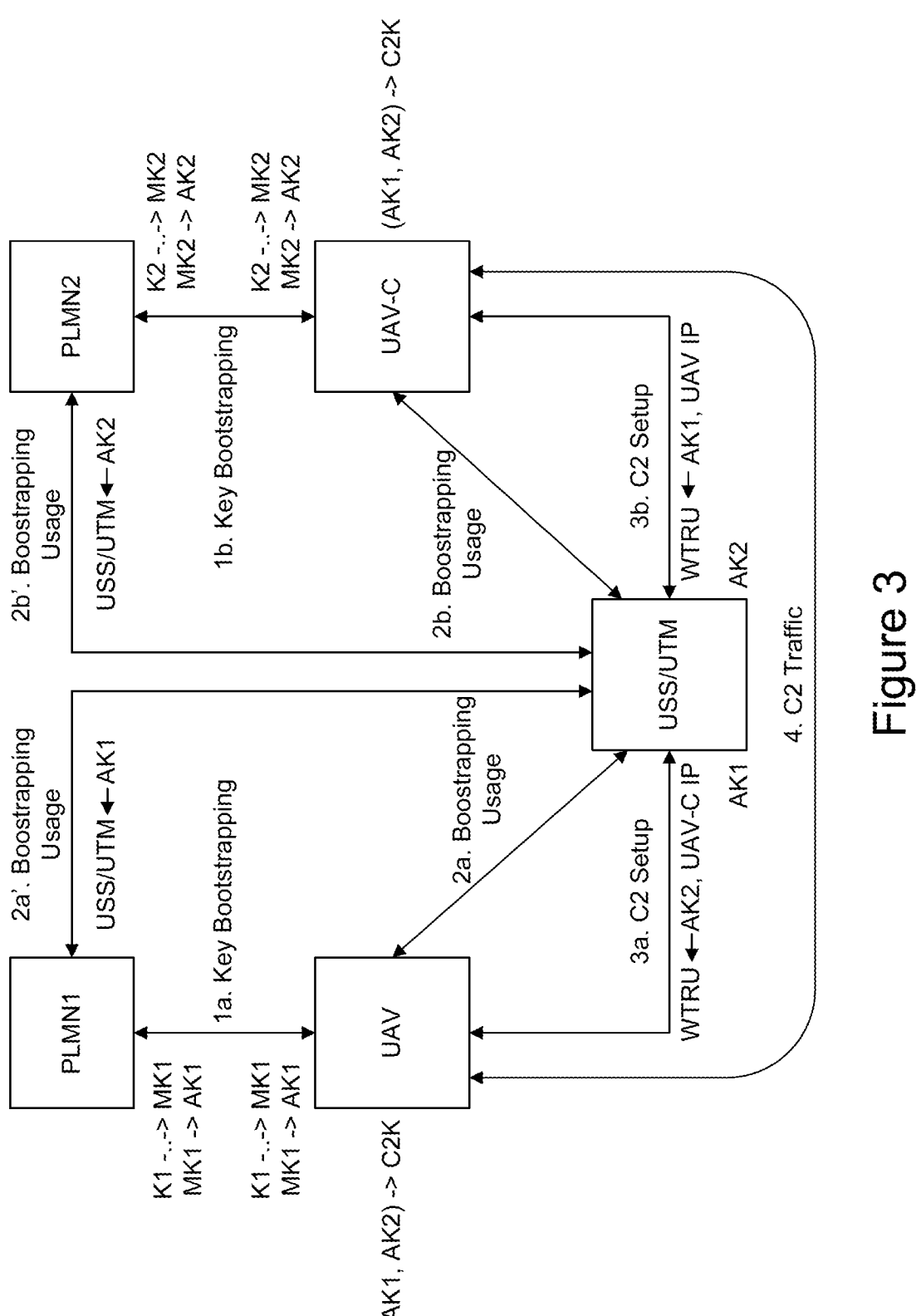
FIG. 3 is a diagram illustrating a USS/UTM brokering of C2 key material for any of a UAV and a UAV-C, using bootstrapped keys (e.g., for multiple PLMNs), according to embodiments.

FIG. 3 is a diagram illustrating a USS/UTM brokering of C2 key material for any of a UAV and a UAV-C, using bootstrapped keys (e.g., for multiple PLMNs), according to embodiments.

According to embodiments, a USS/UTM may (e.g., be a) broker (e.g., of) C2 key material for any of a UAV and a UAV-C. According to embodiments, referring to FIG. 3, a method of (e.g., a solution for) C2 communications security establishment is illustrated. According to embodiments, such a method (e.g., referring to FIG. 3) may include operations (e.g. behavior, steps, etc.) wherein a WTRU/UAV/UAV-C may use (e.g., utilize) a USS/UTM as a broker of key material for C2 communication with UAV-C, for example, based on network bootstrapped keys.

According to embodiments, referring to FIG. 3, WTRU (e.g., any of a UAV or a UAV-C) behavior may include any of the following operations/steps. According to embodiments, a WTRU may perform a key bootstrapping procedure with the network and the WTRU may generate and/or obtain a master session key (MK1) (e.g., from a Network Access Key (K1)). According to embodiments, a WTRU may perform a bootstrapping usage procedure with the USS/UTM and the WTRU may generate a shared master application key (AK1) from MK1. According to embodiments, a network may (e.g., also) generate AK1 from MK1 during the procedure. According to embodiments, a USS/UTM may receive AK1 from the network during the bootstrapping usage procedure.

According to embodiments, a WTRU may perform a USS/UTM-assisted C2 link establishment procedure with a peer (e.g., any of a UAV or a UAV-C). According to embodiments, in a case of a USS/UTM-assisted C2 link establishment procedure, a WTRU may send, to the USS/UTM, a request message that includes a UAV-C ID. According to embodiments, in such a case, WTRUs may receive, from a USS/UTM, any of a UAV-C IP address and a peer key AK2 and the WTRU may generate a shared key for C2 communications (C2K) and its identifier C2K ID using AK1 and AK2. According to embodiments, in such a case (for example, as an alternative to generating the C2K and C2K ID) a WTRU may receive any of a C2K and/or a C2K ID from a USS/UTM, wherein the C2K and/or C2K ID may be generated by the USS/UTM using AK1 and AK2. According to embodiments, a WTRU may use the C2K and/or C2K ID to establish C2 security keys with a peer (e.g., UAV or UAV-C) to protect exchanged C2 traffic.

Figure 4:
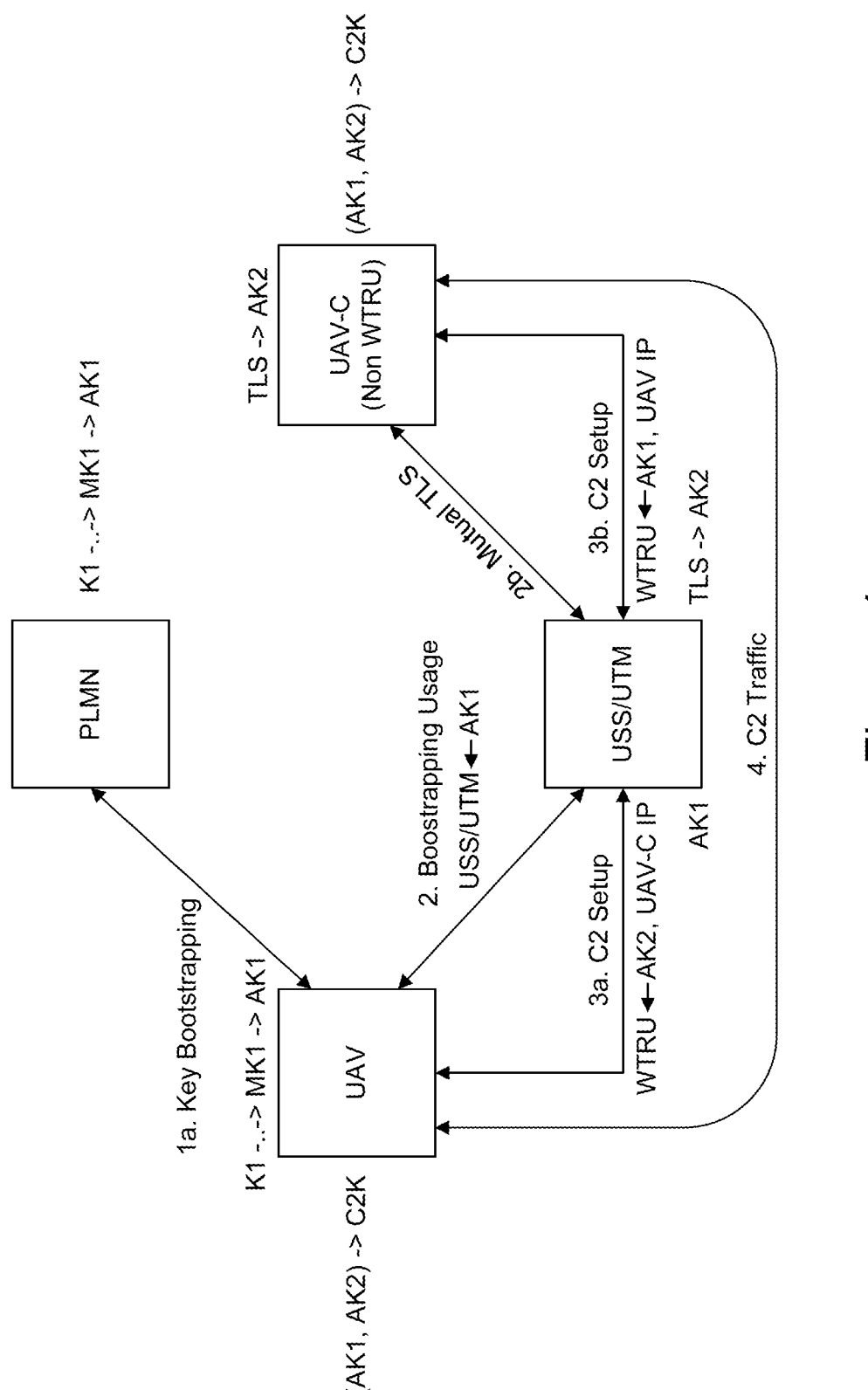
FIG. 4 is a diagram illustrating a USS/UTM broker of C2 key material for UAV and UAV-C, using mixed bootstrapped keys and TLS derived keys, according to embodiments.

FIG. 4 is a diagram illustrating a USS/UTM broker of C2 key material for UAV and UAV-C, using mixed bootstrapped keys and TLS derived keys, according to embodiments.

According to embodiments, referring to FIG. 4, a method (e.g., as an alternative to that of FIG. 3) for C2 communi- cations security establishment is provided, wherein a UAV-C may be connected via means (e.g., a landline connection) other than a PLMN.

According to embodiments, referring to FIG. 4, a WTRU (e.g., a UAV) may receive a peer key AK2 produced from a conventional mutual authentication (e.g., using TLS proto- col) between a USS/UTM and a UAV-C. According to embodiments, as alternative, a WTRU (e.g., any of a UAV and a UAV-C) may receive, from a USS/UTM, a C2K/C2K ID generated from AK1 and AK2.

Figure 5:
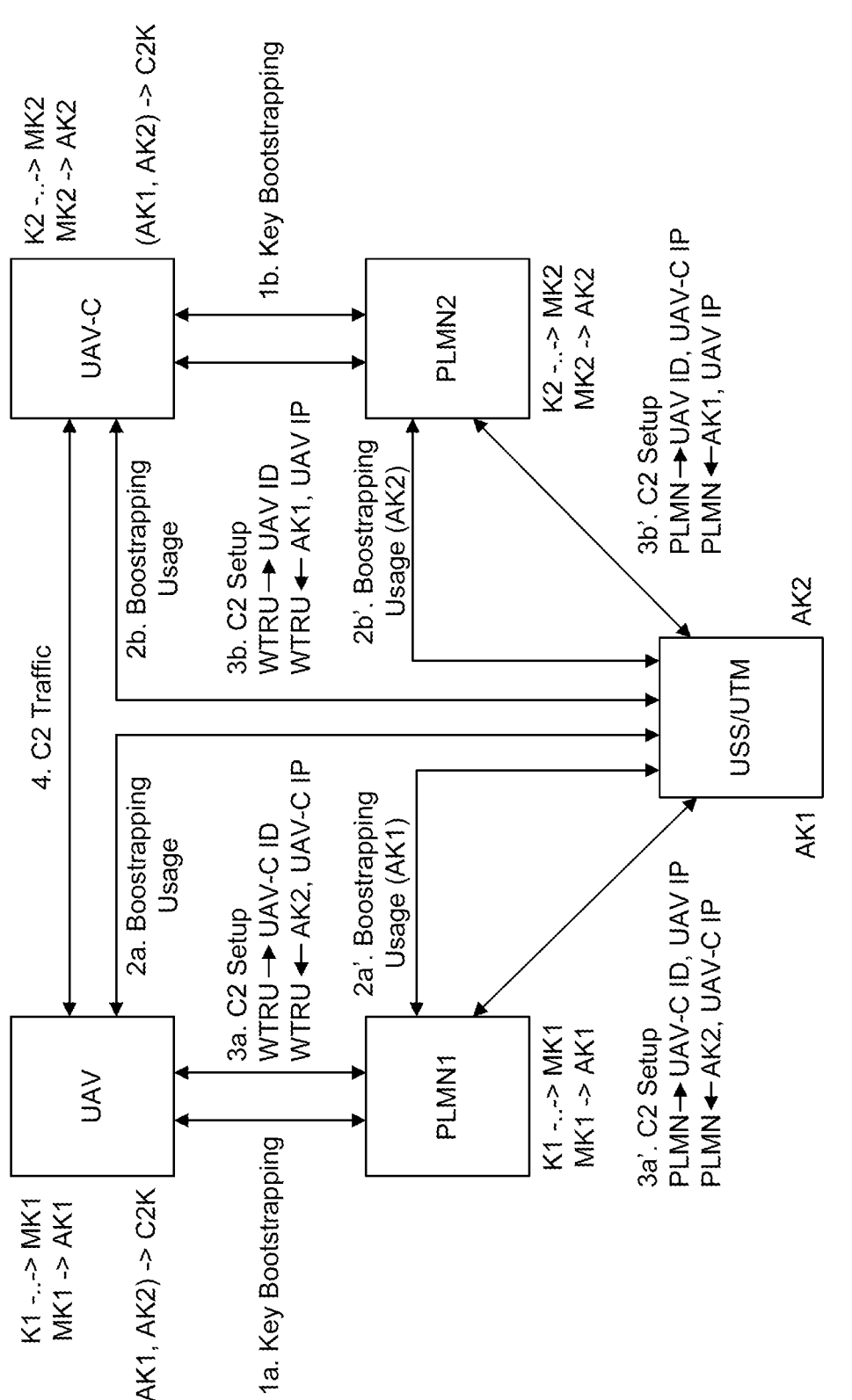
FIG. 5 is a diagram illustrating a PLMN brokering C2 key material for a UAV and a UAV-C (e.g., for multiple PLMNs), according to embodiments.

FIG. 5 is a diagram illustrating a PLMN brokering C2 key material for a UAV and a UAV-C (e.g., for multiple PLMNs), according to embodiments.

According to embodiments, a PLMN may be a broker of C2 key material for UAV and UAV-C. According to embodi- ments, referring to FIG. 5, a method (e.g., operations, steps, etc.) for establishing secure C2 communications may include a WTRU (e.g., any of a UAV or a UAV-C) that may use a PLMN as a broker of key material for C2 communi- cation with another WTRU (e.g., a UAV-C and/or a UAV), for example, based on network bootstrapped keys.

According to embodiments, referring to FIG. 5, WTRU (e.g., any of a UAV or a UAV-C) behavior may include any of the following operations/steps. According to embodi- ments, a WTRU may perform a key bootstrapping procedure with the network and the WTRU may generate (e.g., obtain) a Master Session Key (MK1), for example, from a Network Access Key (K1). According to embodiments, a WTRU may perform a bootstrapping usage procedure with the USS/ UTM and may generate (e.g., obtain) a shared Master Application Key (AK1) from MK1.

According to embodiments, a WTRU may perform a network assisted C2 link establishment procedure with a peer (e.g., any of a UAV and a UAV-C), via a network. In such a case, a WTRU may send, to the network, a request message including a UAV-C ID. Further, in such a case, according to embodiments, a WTRU may receive, from the network, a response message including a UAV-C IP address and a peer key AK2. In such a case, the WTRU may generate a shared C2 communication key (e.g., any of a C2K and a C2K ID) from AK1 and AK2. According to further embodi- ments, (e.g., as an alternative not shown in FIG. 5) a WTRU may receive any of a C2K and/or a C2K ID from a PLMN, wherein the C2K and/or C2K ID may be generated by a USS/UTM (e.g., using AK1 and AK2). According to embodiments, a WTRU may use any of a C2K and/or C2K ID to establish C2 security keys with a peer (e.g., any of a UAV and a UAV-C) to protect exchanged C2 traffic.

According to embodiments, referring to FIG. 5, network (e.g., PLMN1) behavior may include any of the following operations/steps. According to embodiments, a network may perform a key bootstrapping procedure with a WTRU and the network may generate a master session key (MK1) (e.g., from a Network Access Key (K1)). According to embodi- ments, a network may perform a bootstrapping usage pro- cedure with the USS/UTM and the network may generate a shared master application key (AK1) from MK1.

According to embodiments, a network may perform a C2 link establishment procedure with a WTRU and a USS/ UTM. According to embodiments, such a C2 link establish- ment procedure may include any of: (1) a network may receive, from the WTRU, a request message that includes a UAV-C ID; (2) a network may send, to a USS/UTM, the request message (e.g., received from the WTRU) that (e.g., also) includes a UAV IP address; (3) a network may receive, from the USS/UTM, a response message that includes a peer key AK2 (and/or a C2K/C2K ID), and a peer UAV-C IP address; and (4) a network may forward, to a WTRU, the response message that includes AK2 (or C2K/C2K ID), and the peer UAV-C IP address. According to embodiments, a network may enable the exchange of C2 traffic. According to embodiments, a USS/UTM may be any of a secure proxy or a router for C2 traffic between a UAV and a UAV-C.

Figure 6:
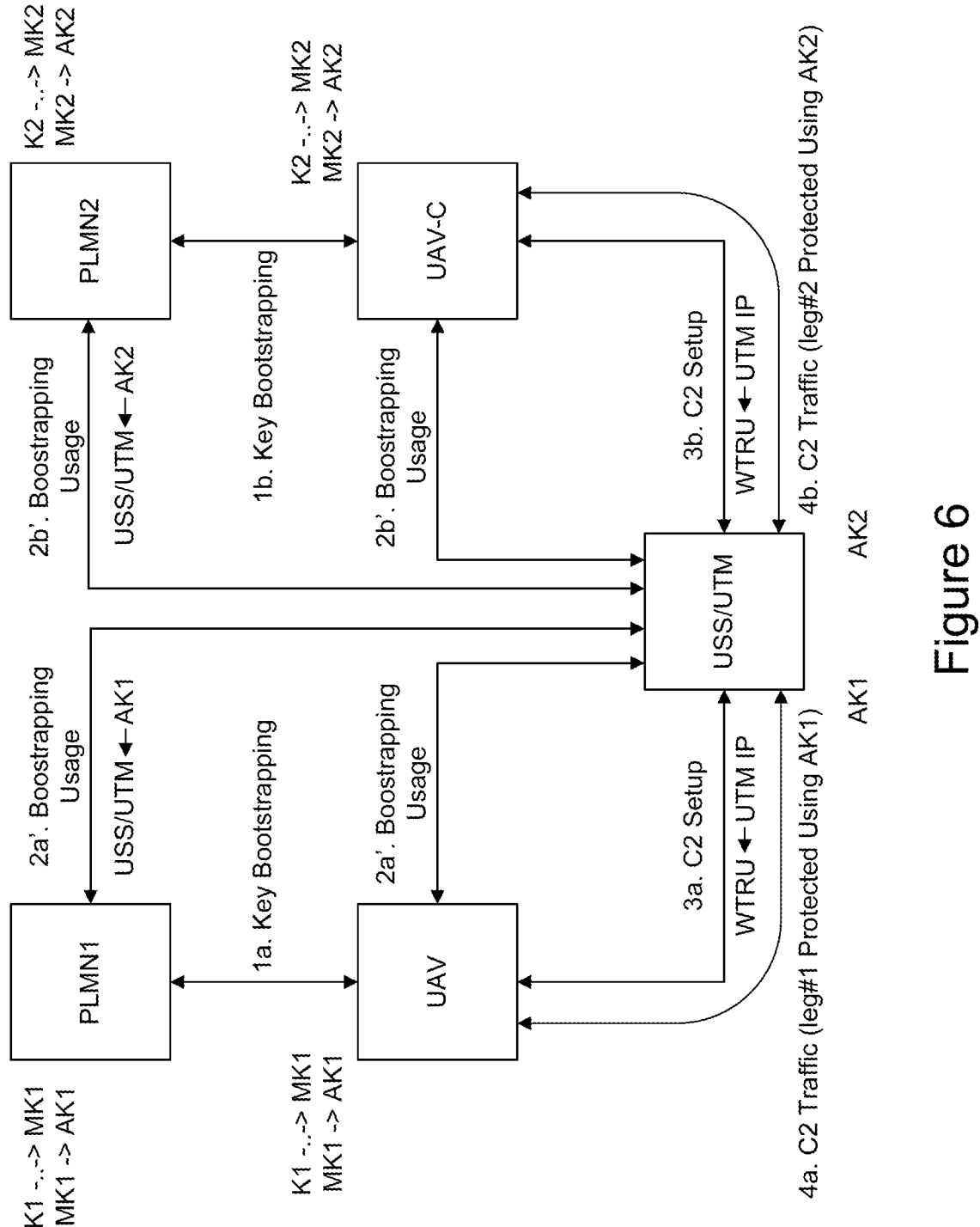
FIG. 6 is a diagram illustrating a UTM as any of a secure proxy or a router for C2 traffic between UAV and UAV-C, according to embodiments.

FIG. 6 is a diagram illustrating a UTM as any of a secure proxy or a router for C2 traffic between UAV and UAV-C, according to embodiments.

According to embodiments, referring to FIG. 6, a method for establishing secure C2 communications may include a WTRU (e.g., a UAV and/or a UAV-C) may use a USS/UTM as a proxy or a router of secure C2 communication with a UAV-C, for example, based on network bootstrapped keys. According to embodiments, referring to FIG. 6, a WTRU (e.g., a UAV and/or a UAV-C) may establish and use a security association (SA) with the USS/UTM, for example, decoupled from the UAV-C. According to embodiments, the UAV-C may (e.g., also) use a SA with a USS/UTM for C2 communications with a UAV. According to embodiments, the USS/UTM may maintain the corresponding SAs (e.g., a SA pair) from a UAV and UAV-C. According to embodi- ments, C2 traffic between UAV and UAV-C may be pro- tected using this SA pair and the C2 traffic may be forwarded (e.g., transparently) via the USS/UTM.

According to embodiments, referring to FIG. 6, a WTRU (e.g., a UAV and/or a UAV-C) behavior may include any of the following operations/steps. According to embodiments, a WTRU may perform a key bootstrapping procedure with a network (e.g., as discussed above). According to embodi- ments, a WTRU may perform a bootstrapping usage proce- dure with the USS/UTM (e.g., as discussed above).

According to embodiments, a WTRU may: (1) perform a UTM-assisted indirect C2 link establishment procedure with a UAV-C, (2) obtain a USS/UTM assigned IP address/port for C2 communications, and (3) establish C2 security keys with USS/UTM from AK1. According to embodiments, (e.g., as an alternative to the preceding) for example, to enable end to end security (e.g., between a UAV and a UAV-C), a WTRU may receive, from a USS/UTM, a peer AK2 to generate a C2K/C2K ID or may receive a C2K/C2K ID (as discussed above) along with the USS/UTM IP address. In such a case, the WTRU may use any of a C2K and/or C2K ID to establish C2 security keys with a peer (e.g., a UAV or a UAV-C) via a USS/UTM to protect C2 traffic routed via the USS/UTM. According to embodiments, a WTRU may exchange C2 traffic with a UAV-C via (e.g., through) a USS/UTM IP using the established C2 security keys.

According to embodiments, referring to FIG. 6, a network (e.g., PLMN1) behavior may include any of the following operations/steps. According to embodiments, a network may perform a key bootstrapping procedure with a WTRU and the network may generate a master session key (MK1) (e.g., from a Network Access Key (K1)). According to embodi- ments, a network may perform a bootstrapping usage pro- cedure with the USS/UTM and may generate a shared master application key (AK1) from MK1.

According to embodiments, referring to FIG. 6, a USS/ UTM behavior may include any of the following operations/ steps. According to embodiments, a USS/UTM may perform a C2 link establishment procedure with a WTRU (e.g., a UAV and/or a UAV-C), including any of: (1) the USS/UTM may receive, from a WTRU, a request message that includes a UAV-C ID (or a UAV ID), and (2) the USS/UTM sends a response message to the WTRU that includes any of a peer key AK2 (or a C2K/C2K ID) and a peer UAV-C (e.g., UAV) IP address. According to embodiments, a USS/UTM may handle the exchange of C2 traffic between a UAV and a UAV-C.

Figure 7:
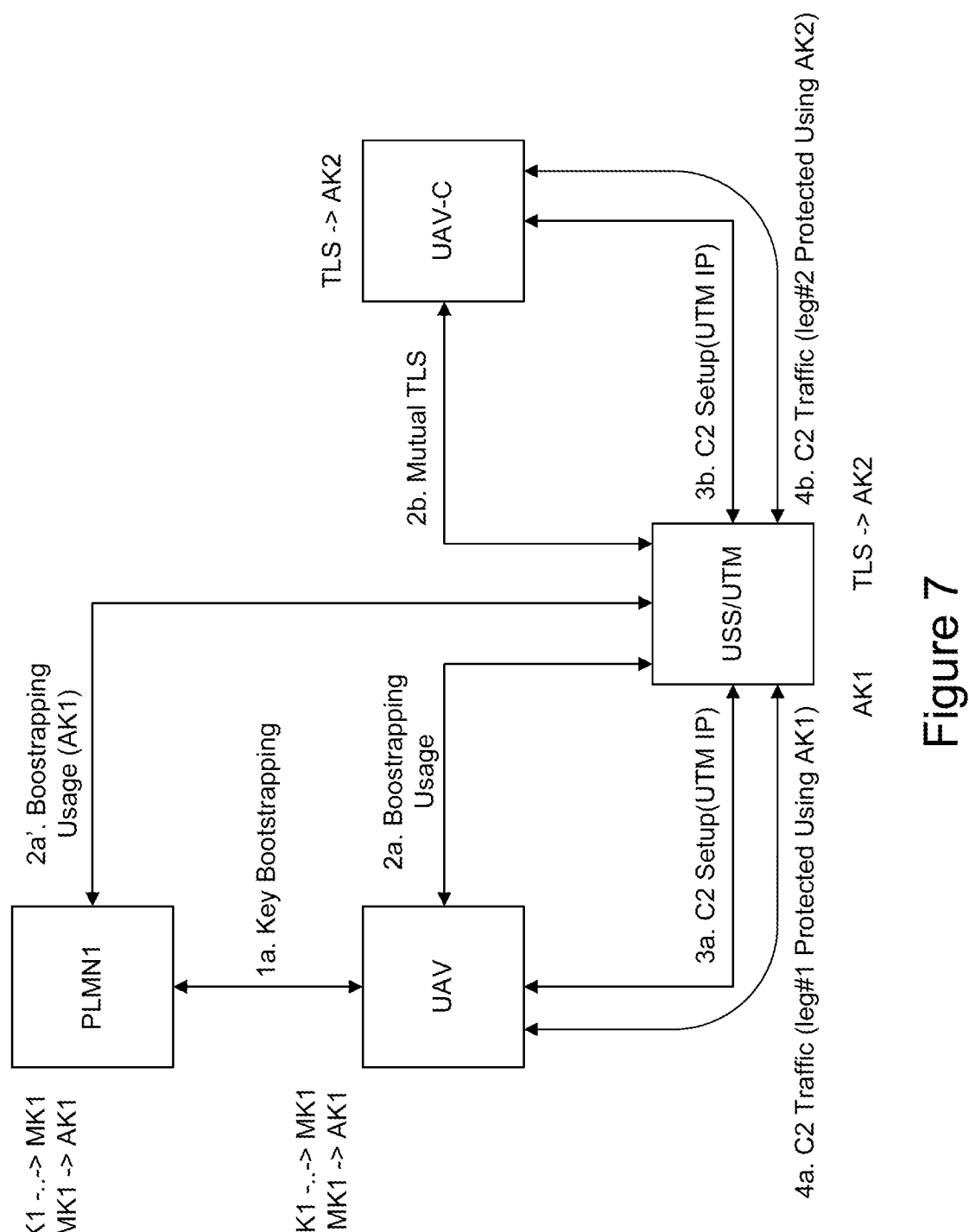
FIG. 7 is a diagram illustrating a UTM as a secure proxy for C2 traffic between UAV and UAV-C, using mixed bootstrapped keys and TLS derived keys, according to embodiments.

FIG. 7 is a diagram illustrating a UTM as a secure proxy for C2 traffic between UAV and UAV-C, using mixed bootstrapped keys and TLS derived keys, according to embodiments.

According to embodiments, referring to FIG. 7, for example, as an alternative to the operations shown in FIG. 7, a method for C2 communications security establishment is shown, wherein a UAV-C is connected via means other than a PLMN (e.g., via a landline).

According to embodiments, referring to FIG. 7, a WTRU (e.g., a UAV) may (e.g., optionally) receive a peer key AK2 produced from a conventional mutual authentication (e.g., using TLS protocol) between USS/UTM and UAV-C. According to embodiments, (e.g., as an alternative) a WTRU (e.g., a UAV) may (e.g., optionally) receive, from a USS/UTM, a C2K/C2K ID generated from AK1 and AK2.

Figure 8:
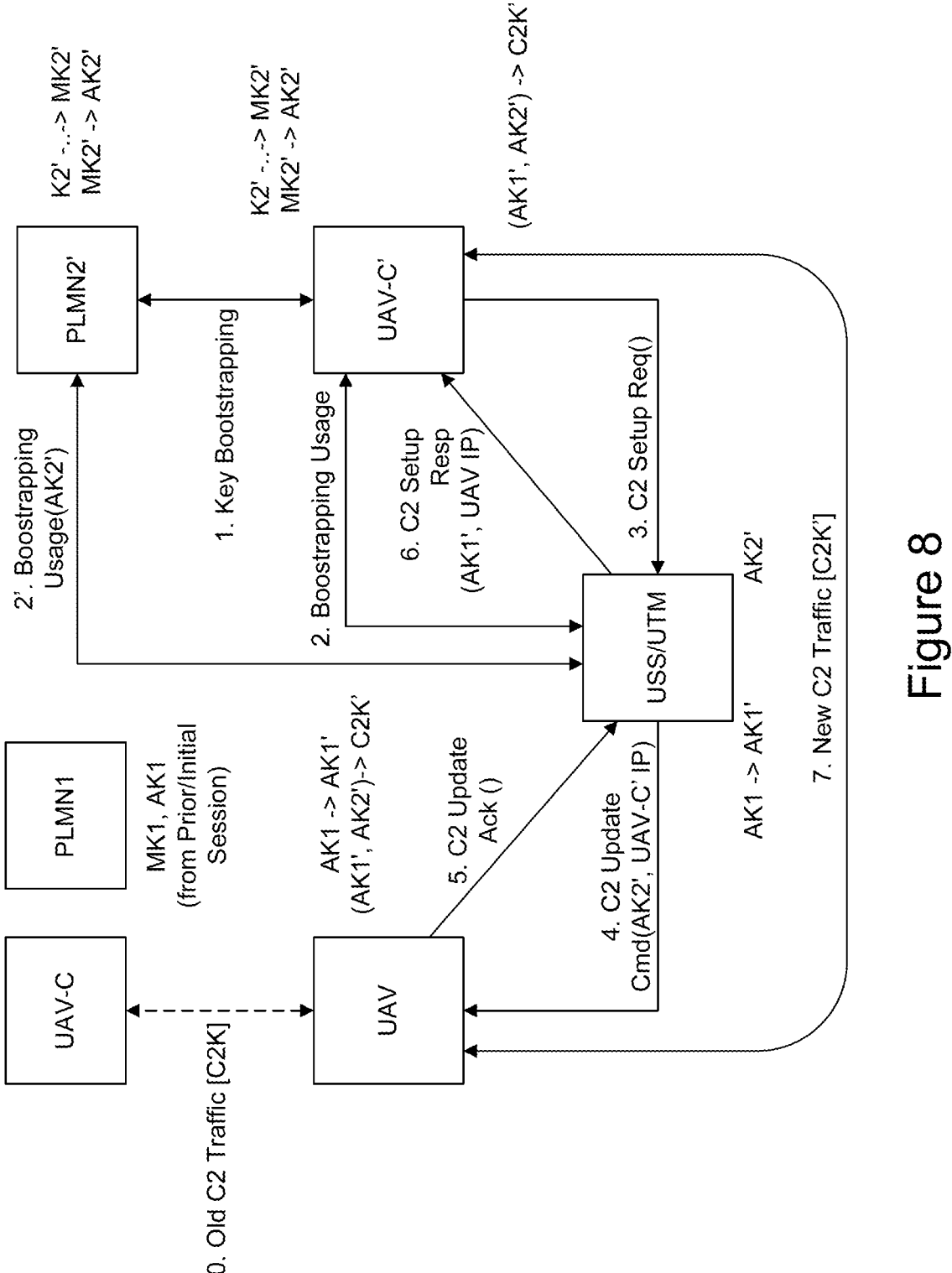
FIG. 8 is a diagram illustrating a UTM as a broker of C2 bootstrapped key material for a UAV and a UAV-C during a UAV-C change, according to embodiments.

FIG. 8 is a diagram illustrating a UTM as a broker of C2 bootstrapped key material for a UAV and a UAV-C during a UAV-C change, according to embodiments.

According to embodiments, a USS/UTM may act as a broker of (e.g., may broker, may be a broker) C2 key material for any of a UAV and a UAV-C, for example, during a change of a UAV-C (e.g., associated with a UAV). According to embodiments, FIG. 8 shows a method for C2 communications security establishment, wherein a WTRU (e.g., a UAV and/or a UAV-C) uses a USS/UTM as a broker of key material for C2 communication during a change of a UAV-C.

According to embodiments, referring to FIG. 8, a WTRU (e.g., UAV) behavior may include any of the following operations/steps. According to embodiments, a WTRU may exchange C2 traffic with a UAV-C using C2K/C2K ID (e.g., after performing procedures as described above).

According to embodiments, a WTRU may receive, from a USS/UTM, a C2 link update command message that includes a new AK2' with a new UAV-C' IP address. According to embodiments, (e.g., as an alternative) a WTRU may receive, in the link update command message, a new C2K'/C2K' ID with a new UAV-C' IP address, wherein the new C2K'/C2K' ID is generated using AK1' and AK2'. According to embodiments, a WTRU may generate: (1) a new AK1' from AK1 and (2) a new C2K' from AK1' and AK2', and the WTRU may send a C2 link update ack message to a USS/UTM. According to further embodiments (e.g., alternatively), a WTRU may send a C2 link update ACK message to a USS/UTM to confirm the reception of the C2K'/C2K' ID. According to embodiments, a WTRU may use the C2K'/C2K' ID to establish C2 security keys with the UAV-C', for example, to protect exchanged C2 traffic. Further, the WTRU may delete the previous C2K/C2K ID and derived keys from local storage.

According to embodiments, referring to FIG. 8, a UAV-C' behavior may include any of the following operations/steps, for example, in a case of a WTRU performing a procedure using a USS/UTM as a broker of C2 key material as described above. According to embodiments, a WTRU (e.g., UAV-C') may send, to a USS/UTM, a C2 setup request message including a new UAV-C' IP address and UAV ID. According to embodiments, a WTRU (e.g., UAV-C') may receive a C2 setup response message that includes a UAV IP address and any of AK1' or C2K'. According to embodiments, in a case where AK1' is received, a WTRU may generate a shared C2 communication key (C2K'/C2K' ID) according to (e.g., based on, from, etc.) AK1' and AK2'. According to embodiments, a WTRU may use a C2K'/C2K' ID to establish C2 security keys with a UAV, for example, to protect exchanged C2 traffic.

According to embodiments, referring to FIG. 8, a USS/UTM behavior may include any of the following operations/steps. According to embodiments, a USS/UTM may be engaged in bootstrapping usage with UAV-C' and a network. According to embodiments, a USS/UTM may receive a C2 setup request from a UAV-C' including a new UAV-C' IP address and UAV ID. According to embodiments, a USS/UTM may find (e.g., determine, detect, etc.) the corresponding C2 communication according to the UAV ID, and the USS/UTM may send a C2 link update command message including a new AK2' and a new UAV-C' IP address to the UAV. According to embodiments, for example, as an alternative, a USS/UTM may send a new C2K'/C2K ID generated using AK1, AK2' (e.g., instead of sending AK2'). According to embodiments, a USS/UTM may receive a C2 link update ack message with AK1'. According to embodiments, a USS/UTM may send a C2 Setup Response message including AK1' and a UAV IP address to a UAV-C'. According to embodiments, for example, as an alternative, a USS/UTM may send a C2K'/C2K' ID generated using AK1, AK2' (e.g., instead of sending AK1')

Figure 9:
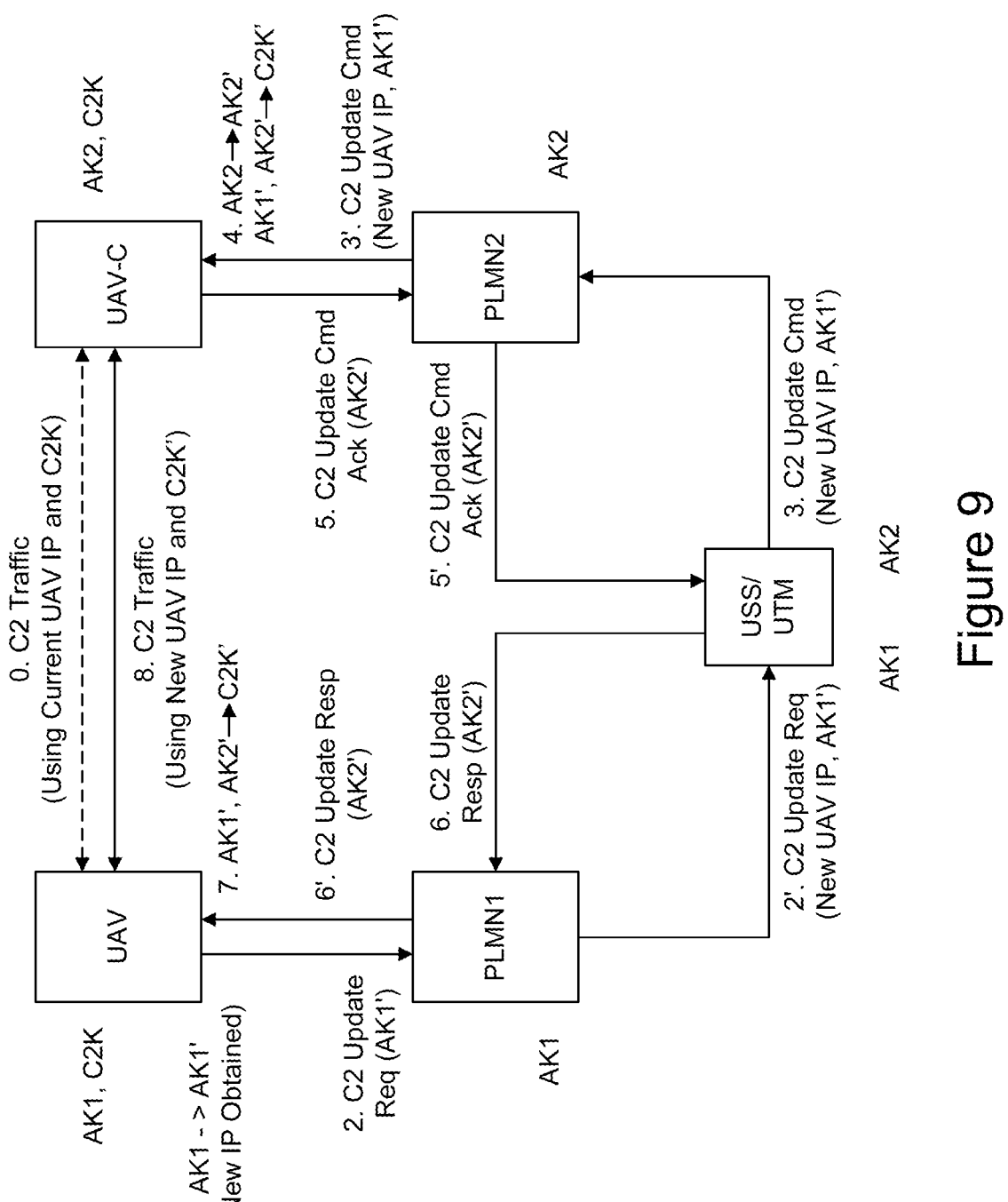
FIG. 9 is a diagram illustrating a USS/UTM as a broker of C2 key material for a UAV and a UAV-C during a change of an IP address of any of a UAV and a UAV-C, according to embodiments.

FIG. 9 is a diagram illustrating a USS/UTM as a broker of C2 key material for a UAV and a UAV-C during a change of an IP address of any of a UAV and a UAV-C, according to embodiments.

According to embodiments, a USS/UTM may be a broker of C2 key material for any of a UAV and UAV-C during any of a UAV IP change or a UAV-C IP change. According to embodiments, referring to FIG. 9, a method for establishing secure C2 communications is provided, wherein a WTRU (e.g., a UAV and/or a UAV-C) may use a USS/UTM as a broker of key material for C2 communication during a change of a UAV IP address.

According to embodiments, a WTRU (e.g., UAV) behavior may include any of the following operations/steps (e.g., operations 0-2 and 6-8 of FIG. 9). According to embodiments, a WTRU may exchange C2 traffic with a UAV-C using a C2K/C2K ID and a current UAV IP address (e.g., as discussed above). According to embodiments, a WTRU may be assigned a new IP address by a network and a WTRU may generate a new AK1' (e.g., based on AK1). According to embodiments, a WTRU may send, to the network, a C2 update request message including a new AK1'. According to embodiments, a WTRU may receive, from the network, a C2 update response that includes a new AK2'. However, according to embodiments, (e.g., as an alternative), a WTRU may receive a new C2K'/C2K' ID. According to embodiments, a WTRU may generate a new C2K'/C2K' ID according to (e.g., using) AK1' and AK2'. According to embodiments, a WTRU may delete a (e.g., previous) C2K/C2K ID and derived keys from a local storage (e.g., as part of the release of the previous connection). According to embodiments, a WTRU may use a C2K'/C2K' ID to establish C2 security keys with a UAV-C, for example, to protect exchanged C2 traffic using the new UAV IP address.

According to embodiments, a WTRU (e.g., UAV-C) behavior may include any of the following operations/steps (e.g., operations 3-5 of FIG. 9). According to embodiments, a WTRU may exchange C2 traffic with a UAV using C2K/C2K ID and a current UAV IP address (e.g., as discussed above). According to embodiments, a WTRU may receive, from a network, a C2 update command message that includes a new AK1', or the WTRU may receive a new C2K'/C2K' ID. According to embodiments, a WTRU may generate a new AK2' (e.g., using AK2) and new C2K'/C2K' ID using AK1' and AK2'.

According to embodiments, a WTRU may delete the previous C2K and derived keys from the WTRU's memory (e.g., local storage). According to embodiments, a WTRU may send, to a network, a C2 update command ACK message including a new AK2'. According to embodiments, a WTRU may use a C2K'/C2K' ID to establish C2 security keys with a UAV, for example, to protect exchanged C2 traffic using the new UAV IP address. According to embodiments (e.g., referring to FIG. 9) C2 connection management messages are illustrated as using CP transport via the network; however, the disclosure is not limited thereto. That is, according to embodiments, the same (e.g., application layer) signaling may be performed using UP transport directly between a UAV or a UAV-C and a USS/UTM.

Figure 10:
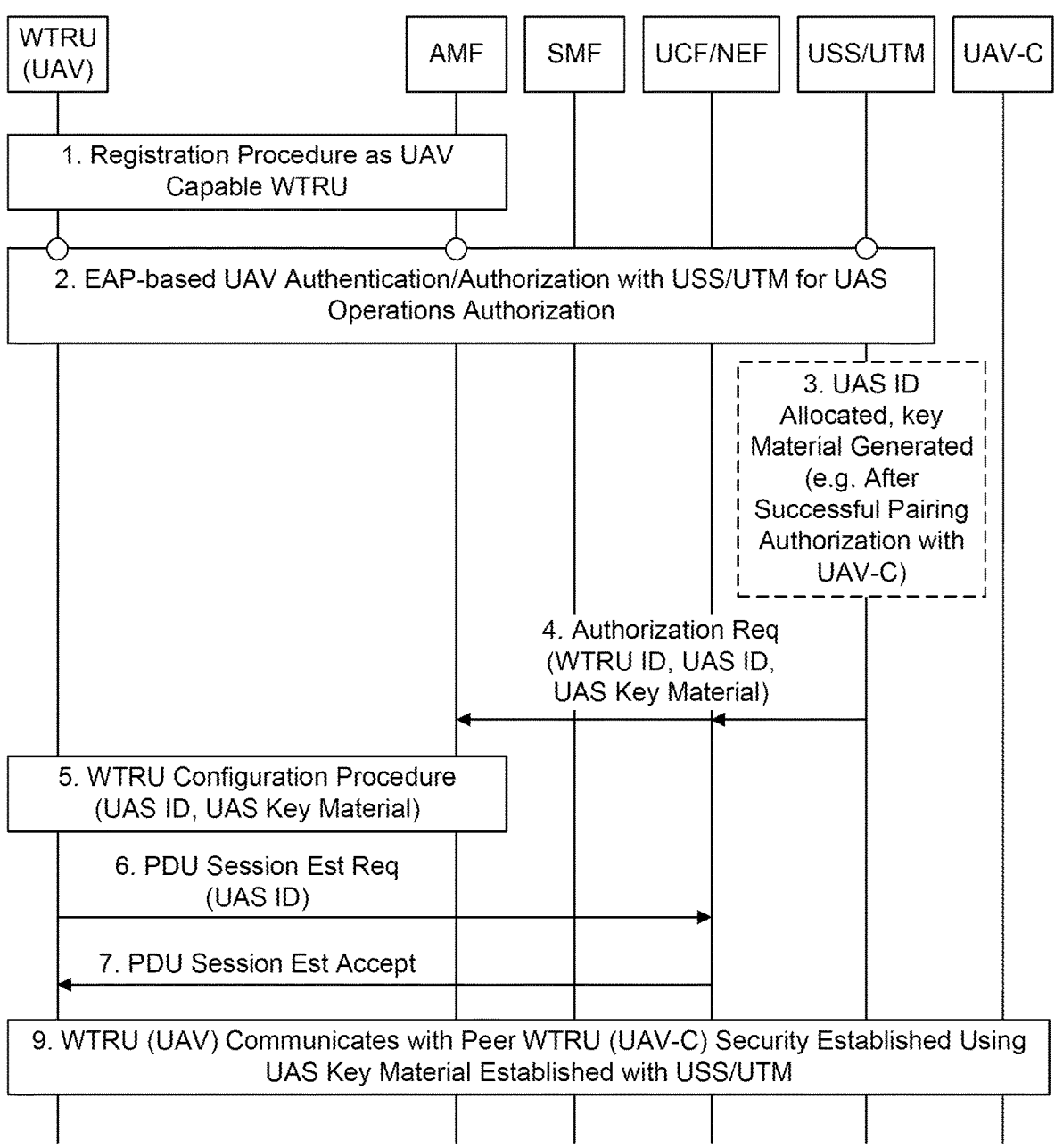
FIG. 10 is a diagram illustrating network-assisted C2 key distribution using registration secondary authentication, according to embodiments.

FIG. 10 is a diagram illustrating network assisted C2 key distribution using registration secondary authentication, according to embodiments.

According to embodiments, a network assisted C2 key distribution using secondary authentication procedures may be performed. According to embodiments, referring to FIG. 10, a method for C2 communications security establishment using a Registration Secondary Authentication procedure may include any of the following operations (e.g., steps).

According to embodiments, at a first operation, a WTRU may perform a registration with the network as a UAV capable WTRU. According to embodiments, at a second operation, a WTRU may perform an EAP-based secondary authentication with a USS/UTM via an AMF. According to embodiments, at a third operation, (e.g., after a successful authentication and authorization) a USS/UTM may allocate a temporary UAS identity (e.g., a UAS ID) and may generate UAS key material (e.g., C2K, C2K ID) for the UAV. According to embodiments, the USS/UTM may allocate the temporary identity and may generate the key material, for example, upon successful pairing authorization with a UAV-C (e.g., triggered by a pairing request from a UAV-C, not shown in FIG. 10).

According to embodiments, at a fourth operation, a USS/UTM may send a request message to UAV serving AMF. According to embodiments, the request message may include the UAS temporary ID and key material, may (e.g., optionally) include a peer UAV-C IP address, and may be forwarded by a UAS Control Function (UCF) and/or a Network Exposure Function (NEF). According to embodiments, at a fifth operation, a WTRU receives, from an AMF, the UAS temporary ID and key material, and the WTRU may (e.g., optionally) receive a peer UAV-C IP address during a WTRU configuration update (UCU) procedure. According to embodiments, at a sixth operation, a WTRU may send, to the SMF, a PDU session establishment request message including the UAS ID. According to embodiments, at a seventh operation, a WTRU may receive a PDU session establishment accept message. According to embodiments, at an eighth operation, a WTRU may establish C2 communications security with a peer UAV-C using the UAS key material. According to embodiments, in a case of a change of a UAV-C, a WTRU may receive a new UAS key material and a new peer UAV-C IP address. In such a case, the WTRU may discard the old values and may use the new values for C2 communications using the PDU Session.

Figure 11:
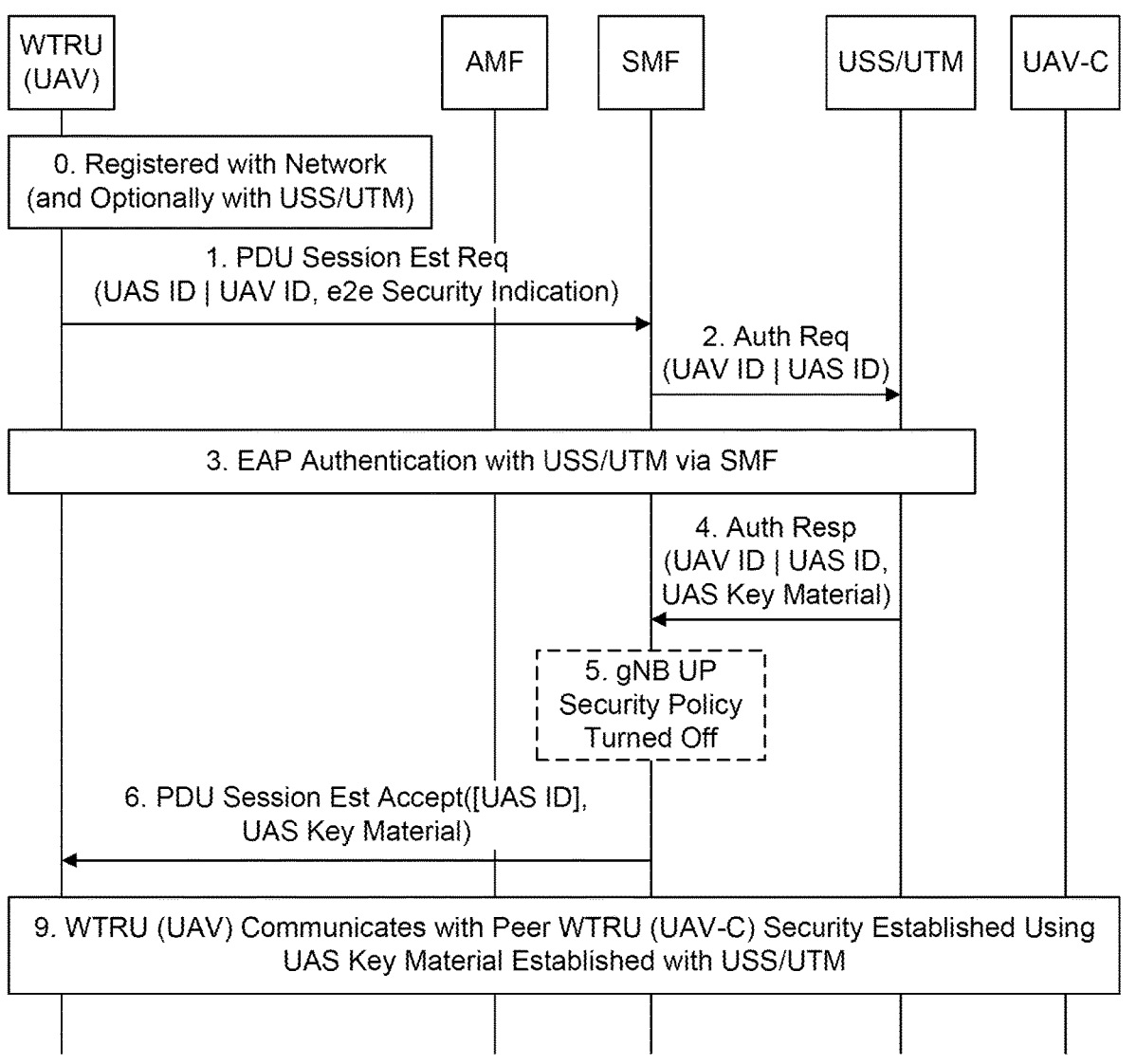
FIG. 11 is a diagram illustrating network-assisted C2 key distribution using a PDU session secondary authentication, according to embodiments.

FIG. 11 is a diagram illustrating network assisted C2 key distribution using a PDU session secondary authentication, according to embodiments.

According to embodiments, a PDU secondary authentication may be performed. According to embodiments, referring to FIG. 11, a method for C2 communications security establishment using a PDU secondary authentication procedure is shown.

According to embodiments, at an initial (e.g., zeroth) operation, a WTRU may be registered with a network and optionally with a USS/UTM. According to embodiments, at a first operation, a WTRU may send, to an SMF, a PDU session establishment request message including an end-to-end security indication (e.g., in an extended protocol configuration option (EPCO) IE). According to embodiments, a WTRU may also include a UAV long term or temporary identity (UAV ID or UAS ID). According to embodiments, at a second operation, the SMF may initiate an EAP-based PDU secondary authentication, with a USS/UTM, for example, by providing the UAV ID and/or UAS ID in an authentication request message. According to embodiments, at a third operation, a WTRU may perform an EAP-based secondary authentication with the USS/UTM via the SMF.

According to embodiments, at a fourth operation, the SMF may receive an authentication response message including the UAS key material, UAV ID, or UAS ID. According to embodiments, at a fifth operation, the SMF may provide the NG-RAN (e.g., gNB, not shown in FIG. 11) with a UP security policy indicating that UP confidentiality and/or UP integrity protection shall not be activated. According to embodiments, at a sixth operation, a WTRU may receive, from the SMF, a PDU session establishment accept message including the UAS key material (e.g., in an EPCO IE). According to embodiments, a WTRU may pass the key material to the upper layers. According to embodiments, at the sixth operation, the WTRU may (e.g., also) receive a UAS temporary identity and the peer UAV-C IP address in the PDU session establishment accept message. According to embodiments, at a seventh operation, the WTRU may establish C2 communications security with the peer UAV-C using the UAS key material. According to embodiments, in a case of a change of a UAV-C, a WTRU may receive a PDU session modification command including a new UAS key material (e.g., in an EPCO IE) and a new peer UAV-C IP address. According to embodiments, in such a case, the WTRU may discard the old values and uses the new values for C2 communications using the PDU Session.

Direct C2 Communications

According to embodiments, (e.g., as discussed hereinbelow) any of operations, procedures, features, actions, and methods performed and/or associated with any of a UAV and a UAV-C may be performed and/or associated with any of a UAV-C and a UAV. For example, according to embodiments, a UAV may act as an announcing/discoverer WTRU and a UAV-C may act as a monitoring/discoveree WTRU, or vice versa.

According to embodiments, discovery may be performed according to (e.g., using) ProSe model A, for example, for link establishment for C2 device to device (D2D) communications. According to embodiments, for example, in a case of (e.g., any of upon, during, or after) a UAV authentication and authorization by a USS/UTM procedure, a WTRU (e.g., a UAV) may receive, from the network, a USS/UTM assigned identity (e.g., any of a UAS ID, a CAA level UAV ID used as a remote ID, etc.) and security parameters (e.g., a root key C2K and/or a C2K ID). According to embodiments, a WTRU may broadcast (e.g., over PC5) a service ID/ProSe code derived from a received UAS ID. According to embodiments, a WTRU may establish a PC5 link with a peer WTRU (e.g., a UAV and/or UAV-C), for example, so that security may be established using a C2K/C2K ID as a pre-shared key, for example, to establish root keys (e.g., any of root key $K_D/K_D$ ID or $K_{NPR}/K_{NPR}$ ID).

According to embodiments, a WTRU (e.g., a UAV) may perform (e.g., a WTRU's behavior may include) any of the following. According to embodiments, for example, over Uu (e.g., via, using, etc., a Uu interface), a WTRU may perform a registration with a network and a USS/UTM. In a case of such registration (e.g., any of during, upon, or after performing such registration, for example, using secondary authentication), a WTRU may receive, from the network (e.g., as part of ProSe configuration/authorization), a USS/UTM assigned identity (e.g., UAS id="random@USS domain") and associated security parameters (e.g., C2K key and C2K ID). According to embodiments, such security parameters may be established according to (e.g., using the) assistance of network and/or USS/UTM.

According to embodiments, for example, over PC5 (e.g., via, using, etc., a PC5 interface), a WTRU may broadcast a message, such as any of a discovery request message or a direct communication request (DCR) message, including a service ID/ProSe code derived from a UAS ID. According to embodiments, for example, as an alternative to broadcasting such message, a V2X WTRU oriented discovery procedure may be performed by sending a DCR message including any of a UAV-C ID or a derivation thereof using (e.g., via, in, etc.) a target user information parameter.

According to embodiments, a WTRU may derive a service ID to be the same as a UAS ID, or may derive a service ID, for example, using any of a concealed UAS ID or an associated pseudonym (e.g., as discussed hereinbelow). According to further embodiments, (e.g., in addition to, or as an alternative, a WTRU may derive the service ID using (e.g., a portion of) a provisioned UAS ID (e.g., a random part excluding a USS realm, least significant bits of a numerical UAS ID, etc.) According to embodiments, for example, over PC5 (e.g., via, using, etc., a PC5 interface), a WTRU may establish a PC5 link with peer WTRU (e.g., UAV and/or UAV-C). In such a case, a WTRU may perform mutual authentication and may establish security with a peer WTRU using a C2K/C2K ID as a pre-shared key (e.g., to derive a root key $K_D/K_D$ ID or $K_{NPR}/K_{NPR}$ ID).

According to embodiments, a WTRU (e.g., a UAV-C) may perform (e.g., a WTRU's behavior may include) any of the following. According to embodiments, for example, over Uu (e.g., via/using, a Uu interface), a WTRU may perform a registration with a network and a USS/UTM. According to embodiments, in a case of performing a registration (e.g., upon, during, after, etc., such registration), a WTRU may receive, from the network, any number of USS/UTM assigned identities (e.g., UAS IDs) and associated security parameters. According to embodiments, a UAV-C may (e.g., simultaneously) use several (e.g., any number of) UAS IDs and associated C2K key/C2K IDs with corresponding peer UAV(s).

According to embodiments, for example, over PC5 (e.g., via, using, etc., a PC5 interface), a WTRU may receive a broadcast message that includes any of a service ID, a ProSe code, and user info, for example, that matches a provisioned UAS ID, such that the service ID may be derived from a UAS ID (e.g., as discussed hereinabove). According to embodiments, for example, over PC5 (e.g., via, using, etc., a PC5 interface), a WTRU may establish a PC5 link with a peer WTRU (e.g., a UAV). According to embodiments, a WTRU may perform mutual authentication and may establish the security (e.g., a secure connection/communication) with the peer WTRU (e.g., the UAV) using a C2K/C2K ID as a pre-shared key.

Figure 12:
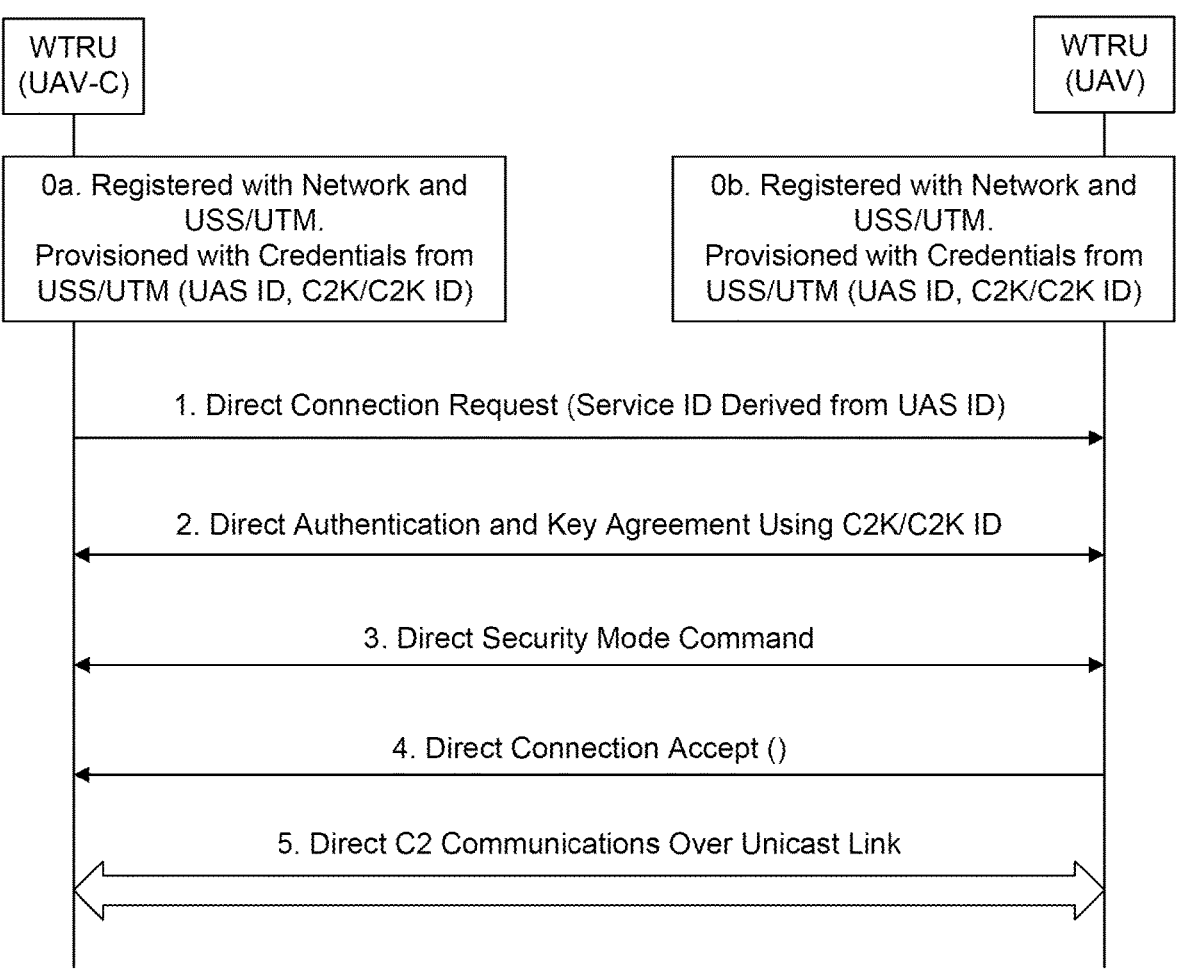
FIG. 12 is a diagram illustrating a UAS layer-2 link establishment procedure, according to embodiments.

FIG. 12 is a diagram illustrating a UAS layer-2 link establishment procedure, according to embodiments.

According to embodiments, referring to FIG. 12, layer-2 link establishment may be performed, for example, to enable direct C2 communication between a UAV and a UAV-C. According to embodiments, a UAS layer-2 link establishment procedure may include any of the following operations (e.g., as shown in FIG. 12).

According to embodiments, at operation 0, (e.g., both of) a UAV and a UAV-C may be registered with a network and USS/UTM and the UAV and the UAV-C may be provisioned with UAS credentials (e.g., as discussed above). According to embodiments, at operation 1, a UAV-C may send a DCR message, for example, to initiate a link establishment. According to embodiments, service information (e.g., included) in the DCR may be (e.g., set to, indicate, etc.) the provisioned UAS ID. According to embodiments, a UAV-C may set (e.g., configure, determine, etc.) the source user information to be its UAV-C ID and may set (e.g., configure, determine, etc.) the target user information to be the UAV-ID. According to embodiments, at operation 2, a UAV may initiate a direct authentication and key agreement procedure with a UAV-C, for example, by using a C2K/C2K ID as a pre-shared key. According to embodiments, at operation 3, a UAV and a UAV-C may perform a direct security mode command procedure, for example, to establish a security context for C2 communications. According to embodiments, at operation 4, a UAV may send a direct communication accept (DCA) message. According to embodiments, at operation 5, a UAV and a UAV-C may exchange C2 traffic over an established unicast link.

According to embodiments, discovery and link establishment for C2 D2D communication may be performed using ProSe model B. According to embodiments, in a case of (e.g., upon, during, after, etc., a procedure for) a UAV authentication and authorization by a USS/UTM, a WTRU (e.g., UAV) may receive, from the network, a USS/UTM assigned ID (e.g., UAS ID) and security parameters (e.g., a master key C2K and C2K ID). According to embodiments, a WTRU (e.g., a UAV-C) may broadcast (e.g., over PC5) a query code derived from the received UAS ID and security parameters. According to embodiments, such a WTRU may establish a PC5 link with a peer WTRU (e.g., a UAV), wherein security is established using a C2K/C2K ID as a pre-shared key, after receiving and checking a response code derived from the received UAS ID and security parameters.

According to embodiments, in a case of discovery using ProSe model B, and link establishment for C2 D2D communication any of the following operations (e.g., behaviors, steps, features, etc.) may be performed by a WTRU that may be operating as a UAV-C or a UAV. According to embodiments, over Uu (e.g., using/via a Uu interface/link), a WTRU may perform a registration with a network and USS/UTM. According to embodiments, in a case of such registration (e.g., upon, during, after, etc., such procedure), a WTRU may receive, from the network, a USS/UTM assigned identity (e.g., a UAS ID) and associated security parameters (e.g., a C2K key and a C2K ID). According to embodiments, over PC5 (e.g., using/via a PC5 interface/link), a WTRU may send a discovery request message including a new query code and nonce1, wherein the query code is derived from a UAS ID and is protected using C2K and nonce1 (e.g., a query code=a UAS ID, protected with a Hash-based/Keyed-Hash Message Authentication Code$_{C2K}$ (HMAC$_{C2K}$) (query code, nonce1)).

According to embodiments, over PC5 (e.g., using/via a PC5 interface/link), a WTRU may receive a discovery request message including a response code and nonce2. According to embodiments, the response code may be derived from a UAS ID and protected using C2K, nonce2, nonce1. According to embodiments, a WTRU may check the validity of the response code (e.g. a response code=UAS ID) protected using the HMAC$_{C2K}$ (response code, nonce1‖ nonce2). According to embodiments, in a case where the response is valid (e.g., the response is derived from a WTRU's UAS ID and it passes a security check), over PC5 (e.g., using/via a PC5 interface/link), a WTRU may establish a PC5 link with a peer WTRU (e.g., a UAV-C or a UAV). According to embodiments, a WTRU may perform mutual authentication and may establish the security with the peer WTRU using a C2K/C2K ID as a pre-shared key.

According to embodiments, in a case of discovery using ProSe model B and link establishment for C2 D2D communication, any of the following operations (e.g., behaviors, steps, features, etc.) may be performed by a WTRU that may be operating as a UAV or UAV-C. According to embodiments, over Uu, (e.g., using/via a Uu interface/link) a WTRU may perform a registration with a network and a USS/UTM. According to embodiments, in a case of performing the registration (e.g., upon, during, after such procedure), a WTRU may receive, from the network, a USS/UTM assigned identity (e.g., UAS ID) and associated security parameters (e.g., a C2K key and a C2K ID). According to embodiments, over PC5, (e.g., over/using/via a PC5 interface/link), a WTRU may receive a discovery request message including a new query code and nonce1, wherein the query code may be derived from a UAS ID and may be protected using C2K, nonce1 (e.g., as discussed above). According to embodiments, in such a case, the WTRU may check (e.g., determine) the validity of the query code.

According to embodiments, in a case where the query code is valid (e.g., the query code is derived from a WTRU's UAS ID and passes security check), over PC5 (e.g., over/using/via a PC5 interface/link), a WTRU may send a discovery response message including a response code and nonce2, wherein the response code is derived from the UAS ID and is protected using C2K, nonce2, nonce1 (e.g., as discussed above). According to embodiments, over PC5 (e.g., over/using/via a PC5 interface/link), a WTRU may establish a PC5 link with a peer WTRU (e.g., a UAV or UAV-C). According to embodiments, a WTRU may perform mutual authentication and the WTRU may establish the security with a peer WTRU using a C2K/C2K ID as a pre-shared key.

According to embodiments, privacy may be provided for identities used for any of a remote ID and/or to enable C2 D2D. According to embodiments, any of a UAV and a UAV-C may use a concealed UAS ID as service ID/code IE or may include a concealed UAS ID as service ID/code in user information IE during direct discovery. According to embodiments, and as referred to herein, a UAS ID may be (e.g., refer to, correspond to) a CAA UAV level ID used as (e.g., for the purpose/functionality of) a remote ID.

According to embodiments, in a case of a concealed UAS ID, a WTRU (e.g., a UAV) may perform any of the following operations (e.g., procedures, features, behaviors, etc.). According to embodiments, in a case of (e.g., during, upon, etc.) ProSe direct discovery, a WTRU may generate a protected service ID/ProSe code using a keyed hash value of UAS ID (e.g. concealed Service ID=HMAC$_{C2K}$ (UAS ID)). According to embodiments, any of the UAS ID and C2K/C2K ID may be provisioned as discussed above. According to embodiments, a WTRU may broadcast a concealed service ID/ProSe code and C2K ID. According to embodiments, a WTRU may stop broadcasting a service ID upon successful PC5 link establishment (e.g., as a one-time service ID).

According to embodiments, in a case of a concealed UAS ID, a WTRU (e.g., a UAV-C) may perform any of the following operations (e.g., procedures, features, behaviors, etc.). According to embodiments, a WTRU may receive, in a PC5 broadcast message, a protected service ID/ProSe code/user information and a C2K ID. According to embodiments, a WTRU may retrieve the UAS ID and C2K associated with a C2K ID, and the WTRU may checks that (e.g., determine whether) the received protected service ID matches a HMAC (e.g., C2K, UAS ID).

According to embodiments, any of a UAV and a UAV-C may use a set of pseudonym identities (which may be referred to as pseudo IDs) as a service ID/code or may include such in user information during direct discovery. According to embodiments, in a case of a set of pseudonym identities, a WTRU (e.g., a UAV) may perform any of the following operations (e.g., procedures, features, behaviors, etc.). According to embodiments, in a case of (e.g., upon, during, after, etc.) a procedure for a UAV authentication and authorization by a USS/UTM, a WTRU may receive, from the network, a USS/UTM assigned identity (e.g., a UAS ID) and any number of pseudonym identities (e.g., pseudo id=random). According to embodiments, pseudonym identities may be allocated by any of a USS/UTM or a network. According to embodiments, over PC5 (e.g., via a PC5 link/interface), a WTRU may (e.g., periodically) broadcast a pseudonym service ID/ProSe code. For example, a pseudonym Service ID/ProSe code may be determined using an XOR operation, such as a UAS ID XOR pseudo ID.

According to embodiments, in a case of a set of pseudonym identities, a WTRU (e.g., a UAV-C) may perform any of the following operations (e.g., procedures, features, behaviors, etc.). According to embodiments, in a case of (e.g., upon, during, after, etc.) a UAV authentication and authorization by USS/UTM procedure, a WTRU may receive, from the network, a USS/UTM assigned identity (e.g., a UAS ID) and any number of pseudo IDs. According to embodiments, a WTRU may receive, in a PC5 broadcast message, a pseudonym Service ID/ProSe code. According to embodiments, a WTRU may checks (e.g., determine) that the received pseudonym Service ID/ProSe code matches the provisioned UAS ID, for example, such that a pseudonym Service ID/ProSe code XOR UAS ID matches one of the provisioned pseudo IDs.

UAV Privacy During Location Tracking Procedure

According to embodiments, there may be a USS/UTM identifier association with a (e.g., any number of) UAV(s) IDs for location tracking performed in a network (e.g., 3GPP system). According to embodiments, any of an exposure function (EF), for example, during a UAV authentication and authorization (A&A) procedure performed by USS/UTM (e.g., NEF/SCEF or similar function), and/or an AMF may store a USS/UTM ID (e.g., any of a FQDN or an IP address of the USS/UTM). According to embodiments, any of such EF and AMF may associate such stored IDs with any of: (1) a 3GPP UAV ID (e.g., a GPSI), and (2) a CAA level UAV ID, of a UAV that is (e.g., successfully) authenticated and authorized. According to embodiments, the EF may obtain such an ID (e.g., an USS/UTM ID associated with a UAV) from a UAV.

According to embodiments, an EF may verify an authenticity of a USS/UTM ID, for example, by using (e.g., having) an associated digital signature by/from the serving USS/UTM which the EF may verify (e.g., use for verification). According to embodiments, (e.g., as any of an alternative, or an addition) an EF may provide (e.g., transmit, send, etc.) a USS/UTM ID to an AMF serving a UAV. According to embodiments, a USS/UTM identifier may be stored in the UDM by the AMF or the EF. According to embodiments, for example, during or after an A&A procedure, an EF may generate and provide a token to a USS/UTM serving a UAV. According to embodiments, (e.g., such) a token may be (e.g., securely) bound to a USS/UTM ID, and/or the token may be (e.g., securely) bound to a 3GPP UAV ID.

According to embodiments, a token may be provided (e.g., by a USS/UTM) when sending a request, for example, according to embodiments discussed hereinbelow. According to embodiments, a USS/UTM identifier may be verified, for example, during a location request for a (e.g., particular, certain, etc.) UAV. That is, according to embodiments, there may be a verification of USS/UTM identifier during location request for a particular UAV. According to embodiments, for example, during a location tracking procedure (e.g., performed by a USS/UTM, an EF may receive a UAV location request from a USS/UTM, and the location request may include any of a 3GPP UAV ID and an ID of a/the requesting USS/UTM. According to embodiments, an EF may check (e.g., verify, determine, compute, etc.) authenticity of the USS/UTM identifier (e.g., with/using any of a signature by/from the USS/UTM or a token by/from the EF). According to embodiments, an EF may check (e.g., determine, verify, compute, etc.) that an identifier of the USS/UTM making the request matches the USS/UTM ID associated with the 3GPP UAV ID, for example, an ID of a serving USS/UTM, previously associated with the 3GPP UAV ID, as discussed above.

According to embodiments, an EF may forward a UAV location request to a (e.g., the appropriate) location tracking function (e.g., an AMF, a GMLC, etc.) in a case where the USS/UTM identifiers match. Further, in such a case, an EF may discard or reject the location request if the IDs do not match. According to embodiments, an EF may forward a UAV location request to the AMF, for example, including information indicating any of a 3GPP UAV ID and an ID of a requesting USS/UTM. According to embodiments, an AMF may check (e.g., verify, determine, compute, etc.) that the ID of the USS/UTM associated with the UAV (e.g., locally stored, obtained from a UDM) matches the one received from an EF (e.g., the USS/UTM making the location request). According to embodiments, an AMF may obtain UAV location request information and may send such information to the requesting EF, for example, in a case where the USS/UTM identifiers match. Further, in such a case, an AMF may discard or reject the location request if the USS/UTM identifiers do not match.

According to embodiments, there may be verification of a USS/UTM ID during a location request for any UAV in a (e.g., given) location/area. For example, according to embodiments, during a location tracking procedure (e.g., performed by a USS/UTM, an EF may receive a location request from a USS/UTM for any UAV in a (e.g., given) location and/or area. According to embodiments, a (e.g., such a) location request may include information indicating any of area attributes (e.g., geographical coordinates) and a USS/UTM ID. According to embodiments, an EF may verify authenticity of a location request (e.g., with/by using a signature by/from a USS/UTM and/or a token from an EF). According to embodiments, an EF (e.g., after verifying authenticity of the request) may forward the request to a (e.g., the appropriate) location tracking function (e.g., an AMF, a GMLC, etc.), and the EF may send (e.g., include with the forwarded request) an indication that the request is for any (e.g., unknown) UAV(s) (e.g., than may be) in a target area.

According to embodiments, an AMF may obtain location information of all the UAVs in an (e.g., a target, a given, a certain, etc.) area. According to embodiments, an AMF may select (e.g., filter, only, etc.) WTRUs that fulfill relevant UAV selection criteria. That is, according to embodiments, an AMF may select (e.g., determine, filter, etc.) WTRUs in a (e.g., target) location/area, for example, so as to select (e.g., filter, only, etc.) those WTRUs that fulfill relevant UAV selection criteria (e.g., with a valid UAV subscription and/or that have been authorized by a USS/UTM). According to embodiments, an AMF may send location information for each of the UAVs that are in the given area, the location information including a 3GPP UAV ID for each UAV. According to embodiments, in such a case, for each UAV, the EF may check (e.g., determine, compute, verify, etc.) that an ID associated with the 3GPP UAV ID (e.g., previously associated with the 3GPP UAV ID as discussed above) matches the ID of the USS/UTM that sent the location request. According to embodiments, an EF selects UAVs whose 3GPP UAV ID is associated with an ID of the USS/UTM that sent the location request; and the EF, for each of the selected UAVs, sends the UAV's location information to the USS/UTM.

According to embodiments, an EF may forward a location request to the AMF, and the (e.g., forwarded) location request may indicate (e.g., include information indicating) any of: (1) target area information (e.g., as a cellular area associated with (i.e., mapping to) the requested geographical area); (2) an ID of the requesting USS/UTM; and (3) an indication that the location request is for location tracking for "any UAV in that (e.g., a certain) area". According to embodiments, an AMF may perform filtering on/of the WTRUs in the given area, for example, in order to select (e.g., only) WTRUs that are UAVs served by a/the requesting USS/UTM. According to embodiments, for example, during a location tracking procedure, an AMF may select (e.g., only) WTRUs with a valid UAV subscription and that have been authorized by the same USS/UTM. For example, the AMF may check (e.g., determine) that the ID of the USS/UTM associated with the UAV matches the USS/UTM ID received from EF. In the same example, for each of the selected UAVs, the AMF may send the UAV's ID (e.g., any of 3GPP UAV ID, CAA level UAV ID) to the requesting EF.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating and/or interconnected computer readable medium, which exists exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation.

Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented in an unmanned aerial vehicle (UAV), the method comprising:
   sending a packet data unit (PDU) session establishment request message, wherein the PDU session establishment request message comprises an indication of a UAV identity (ID) of the UAV for command and control (C2) communication establishment between the UAV and a first UAV controller (UAV-C);
   receiving a PDU session establishment accept message, wherein the PDU session establishment accept message comprises C2 security information for C2 communications between the UAV and the first UAV-C; and
   receiving a PDU session modification message, wherein the PDU session modification message comprises second C2 security information for C2 communications with a second UAV-C.

2. The method of claim 1, wherein a first extended protocol configuration option (EPCO) information element (IE) comprises the PDU session establishment request message, and wherein a second EPCO IE comprises the PDU session establishment accept message.

3. The method of claim 2, wherein a third EPCO IE comprises the PDU session establishment modification message.

4. The method of claim 1, wherein the PDU session establishment accept message is received via a cellular communication network.

5. The method of claim 4, wherein the PDU session establishment message is sent to a session management function (SMF) of the cellular communication network.

6. The method of claim 1, wherein the C2 security information comprises unmanned aerial systems (UAS) key material.

7. The method of claim 1, wherein the PDU session establishment accept message further comprises one or more of a UAS temporary ID and an internet protocol (IP) address associated with the first UAV-C.

8. The method of claim 7, wherein the PDU session establishment modification message further comprises a second IP address associated with the second UAV-C.

9. An unmanned aerial vehicle (UAV) comprising:
   a processor configured to:
   send a packet data unit (PDU) session establishment request message, wherein the PDU session establishment request message comprises an indication of a UAV identity (ID) of the UAV for command and control (C2) communication establishment between the UAV and a first UAV controller (UAV-C);
   receive a PDU session establishment accept message, wherein the PDU session establishment accept message comprises C2 security information for C2 communications between the UAV and the first UAV-C; and
   receive a PDU session modification message, wherein the PDU session modification message comprises second C2 security information for C2 communications with a second UAV-C.

10. The UAV of claim 9, wherein a first extended protocol configuration option (EPCO) information element (IE) comprises the PDU session establishment request message, and wherein a second EPCO IE comprises the PDU session establishment accept message.

11. The UAV of claim 10, wherein a third EPCO IE comprises the PDU session establishment modification message.

12. The UAV of claim 9, wherein the processor is configured to receive the PDU session establishment accept message via a cellular communication network.

13. The UAV of claim 12, wherein the PDU session establishment message is sent to a session management function (SMF) of the cellular communication network.

14. The UAV of claim 9, wherein the C2 security information comprises unmanned aerial systems (UAS) key material.

15. The UAV of claim 9, wherein the PDU session establishment accept message further comprises one or more of a UAS temporary ID and an internet protocol (IP) address associated with the first UAV-C.

16. The UAV of claim 15, wherein the PDU session establishment modification message further comprises a second IP address associated with the second UAV-C.

* * * * *